(12) United States Patent
Tanaka

(10) Patent No.: US 8,977,671 B2
(45) Date of Patent: Mar. 10, 2015

(54) DIVIDER CIRCUIT AND DIVISION METHOD

(75) Inventor: Mihoko Tanaka, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 488 days.

(21) Appl. No.: 13/324,915

(22) Filed: Dec. 13, 2011

(65) Prior Publication Data
US 2012/0150932 A1    Jun. 14, 2012

(30) Foreign Application Priority Data

Dec. 14, 2010   (JP) ................................. 2010-278621
Oct. 4, 2011    (JP) ................................. 2011-220133

(51) Int. Cl.
*G06F 7/52*    (2006.01)
*G06F 7/535*   (2006.01)

(52) U.S. Cl.
CPC ..................................... *G06F 7/535* (2013.01)
USPC ....................................................... 708/653

(58) Field of Classification Search
USPC .................................................. 708/650, 653
See application file for complete search history.

(56) References Cited

U.S. PATENT DOCUMENTS 5,675,528 A * 10/1997 Matula .......................... 708/650
6,199,056 B1 * 3/2001 Pappalardo et al. .............. 706/3
7,007,058 B1 * 2/2006 Kotlov .......................... 708/654

FOREIGN PATENT DOCUMENTS

JP    7-160479 A    6/1995

* cited by examiner

*Primary Examiner* — Chuong D Ngo
(74) *Attorney, Agent, or Firm* — McGinn IP Law. Group, PLLC

(57) ABSTRACT

A divider circuit includes: a register which is configured of an even number of bits and in which a dividend data is stored. A shift operation section is configured to acquire a data stored in an upper bit portion of the register when the even number of bits of the register is equally divided to the upper bit portion and a lower bit portion, as a quotient data when the dividend data is divided by a maximum of a divisor data which can be expressed by a half of the even number of bits of the register.

16 Claims, 22 Drawing Sheets

Fig. 18

| DIVISOR | BITS OF DIVISOR | DIVIDEND | BITS OF DIVIDEND |
|---|---|---|---|
| 3 | 2 | 1~15 | 4 |
| 7 | 3 | 1~63 | 6 |
| 15 | 4 | 1~255 | 8 |
| 31 | 5 | 1~1023 | 10 |
| 63 | 6 | 1~4095 | 12 |
| 127 | 7 | 1~16383 | 14 |
| 255 | 8 | 1~65535 | 16 |
| . | . | . | . |

Fig. 19

|  | REG. 1 | SEC. 2 | REG. 3 | SEC. 4 | SEC. 5 | SEC. 6 | SELECTOR 7 | SEC. 8 | SEC. 9 | TOTAL |
|---|---|---|---|---|---|---|---|---|---|---|
| 1ST | 128 | 0 | 72 | - | - | - | - | - | - | 200 |
| 2ND | 128 | 140 | 72 | 104 | - | - | - | - | - | 444 |
| 3RD | 128 | 0 | 72 | 104 | 56 | 56 | 320 | - | - | 736 |
| 4TH | 128 | 0 | 72 | 104 | 56 | - | 320 | 56 | - | 680 |
| 5TH | 136 | 0 | 80 | 104 | 56 | 56 | 320 | - | - | 808 |
| 6TH | 128 | 0 | 72 | - | 56 | 56 | 360 | - | 64 | 736 |
| 7TH | 128 | 0 | 72 | - | 56 | - | 360 | 56 | 64 | 680 |
| 8TH | 136 | 0 | 80 | - | 56 | 56 | 360 | 56 | 64 | 808 |

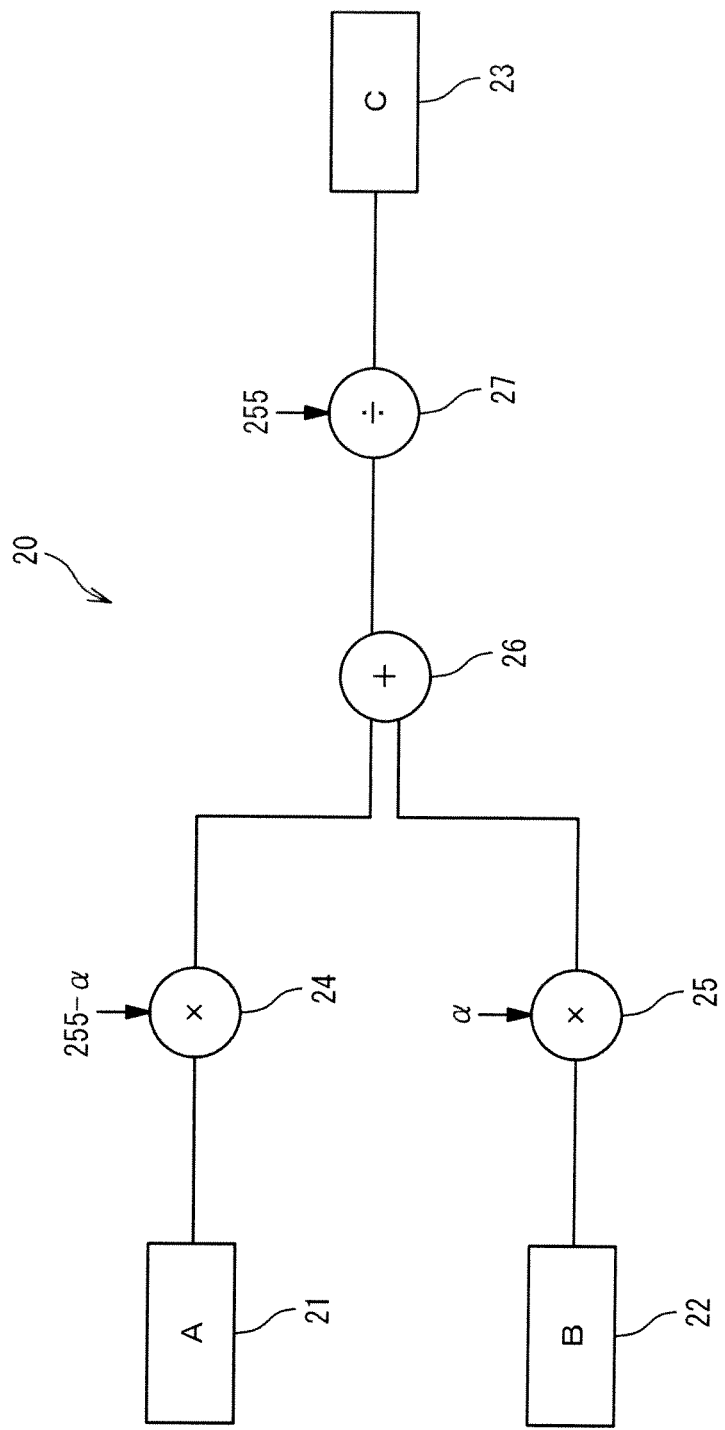

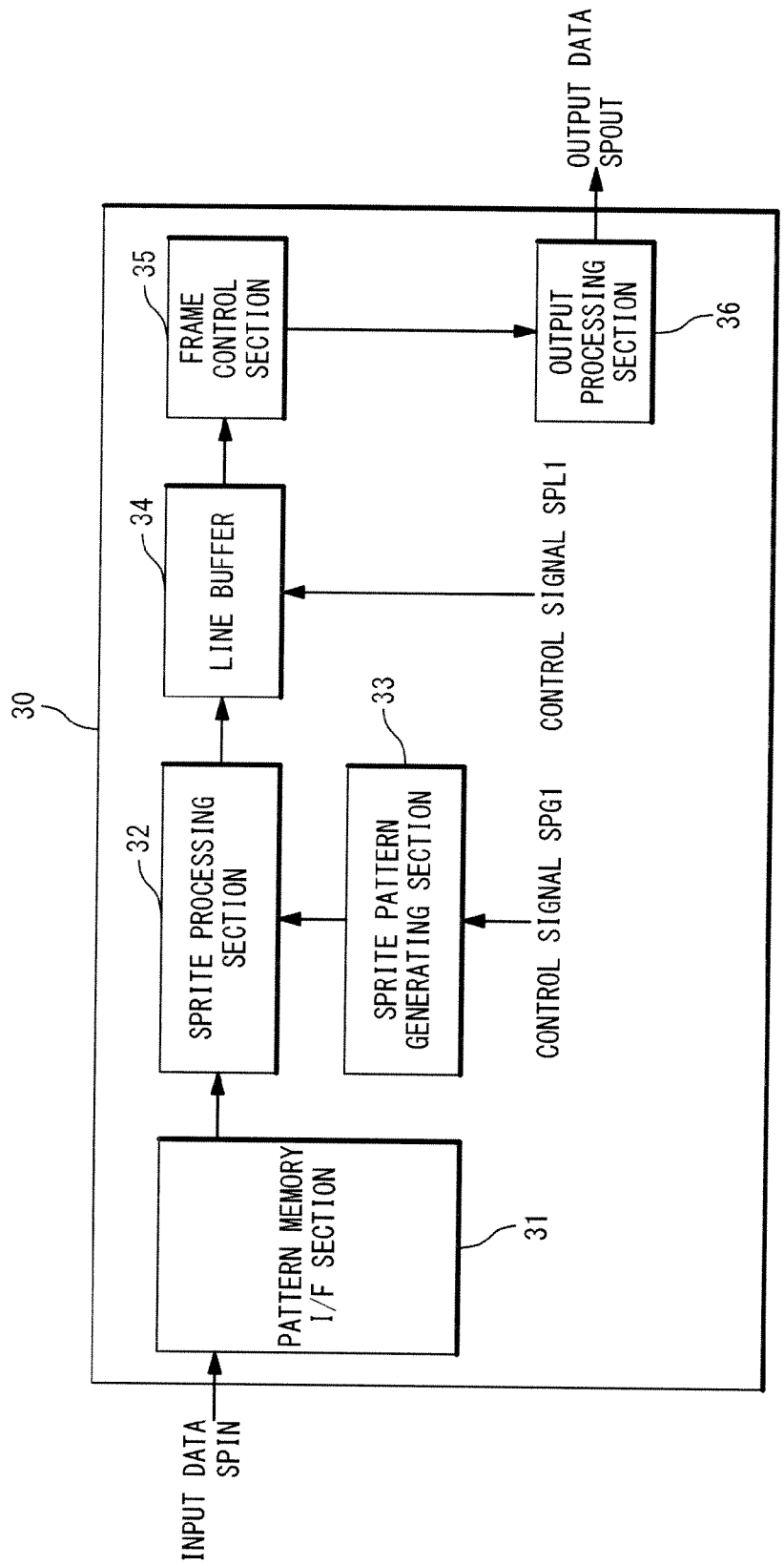

DIVIDER CIRCUIT AND DIVISION METHOD

CROSS-REFERENCE

This patent application claims priorities on convention based on Japanese Patent Application Nos. JP 2010-278621 and JP 2011-220133. The disclosures thereof are incorporated herein by reference.

TECHNICAL FIELD

The present invention is related to a divider circuit.

BACKGROUND ART

A divider realized in hardware is used as a basic part of a semiconductor integrated circuit. In recent years, the chip size of the semiconductor integrated circuit is increasing through extension of a function of the semiconductor integrated circuit, while the chip size of the semiconductor integrated circuit is required to be reduced for saving a manufacturing cost of the semiconductor integrated circuit.

In the development of a large-scale SOC (System On a Chip), the need of a divider circuit is increasing in which the circuit scale is suppressed even if a bit width of a register set with a dividend or a divisor increases.

A technique of a recovery-type divider circuit is disclosed in Patent Literature 1 (JP 07-160479A) in which a power consumption amount can be reduced.

First, a general recovery-type divider circuit will be described.

FIG. 1 is a block diagram showing the whole configuration of a recovery-type divider circuit. The recovery-type divider circuit of FIG. 1 is provided with a register X of 16 bits, a register Q of 16 bits and partial dividers D0 to D15. Also, although being not shown in FIG. 1, a 16-bit register Y is provided to store divisor data. The register X stores dividend data. Quotient data when the dividend data stored in the register X is divided by the divisor stored in the register Y can be obtained by sequentially operating the partial dividers D15 to D0. The operation results by the partial dividers D15 to D0 are finally stored in the register Q from MSB (Most Significant Bit) to LSB (Least Significant Bit) as the quotient data. Remainder data can be determined from the output R0 of the last-stage partial divider D0.

FIG. 2 is a block diagram showing the configuration of the partial divider D15 shown in FIG. 1. The partial divider D15 is provided with a subtractor J15 and a partial remainder selecting circuit S15. The subtractor J15 subtracts the divisor data stored in the register Y from bit data X15 as the MSB of the register X and outputs the subtraction result data A15 to the partial remainder selecting circuit S15. Also, the subtractor J15 outputs bit data B15 to the Q15 as the MSB of the register Q and the input S of the partial remainder selecting circuit S15. The bit data B15 is "0" if the subtraction result data A15 is negative and "1" if the subtraction result data A15 is equal to or more than "0". The partial remainder selecting circuit S15 is a selector (a multiplexer) which outputs either of data at an input 0 or data at an input 1 as the output U according to the input S. If the value of the input S is "1", the partial remainder selecting circuit S15 outputs the subtraction result data A15 at the input 1 as the partial remainder data R15. If the value of the input S is "0", it outputs the MSB X15 of the register X at the input 0 as the partial remainder data R15.

FIG. 3 is a block diagram showing the configuration of the partial divider used for the partial dividers D14 to D0 of FIG. 1. The partial divider Dn is provided with a register Tn, a subtractor Jn and a partial remainder selecting circuit Sn. The register Tn synthesizes data Wn by adding data Xn to the LSB side of data R(n+1) from the partial divider D(n+1). For example, Wn=0101101 if R(n+1) is 010110 and Xn is "1". The partial dividers D14 to D0 are different from the partial divider D15 of FIG. 2 in that the register Tn which stores the data Wn is further provided and that the subtractor Jn calculates a difference Wn-Y by using Wn not X15.

The subtractor Jn subtracts the divisor data stored in the register Y from the data Wn stored in the register Tn and outputs the subtraction result data An to the partial remainder selecting circuit Sn. Also, the subtractor Jn outputs bit data Bn to Qn of the register Q and the input S of the partial remainder selecting circuit Sn. The bit data Bn is "0" if the subtraction result data An is negative, and "1" if the subtraction result data is equal to or more than "0". The partial remainder selecting circuit Sn is a selector (a multiplexer) which outputs either of input 0 or input 1 as an output S according to the input S. The partial remainder selecting circuit Sn outputs the subtraction result data An of the input 1 as the partial remainder data Rn if the value of the input S is "1", and outputs Wn of the input 0 as the partial remainder data Rn if the value of the input S is "0".

By adopting the above configuration, the quotient when the dividend stored in the register X is divided by the divisor stored in the register Y is stored in the register Q. A remainder when the dividend stored in the register X is divided by the divisor stored in the register Y is outputted as R0 by the output U of the partial remainder selecting circuit Sn of the partial divider circuit D0.

The general recovery-type divider circuit is as described above.

The technique of a new divider circuit is disclosed in JP H07-160479A (Patent Literature 1), in which the above-described recovery-type divider circuit is improved to reduce a consumed power amount. In this technique, the improvement to reduce the consumed power amount is applied to the above-described partial dividers D15 to D0. FIG. 4 is a block diagram showing the configuration of the partial divider used for the partial divider D15 in Patent Literature 1. FIG. 5 is a block diagram showing the configuration of the partial divider circuit used for the partial dividers D14 to D0 in Patent Literature 1. The improved recovery-type divider circuit is different from the general recovery-type divider circuit in that an operation result predicting circuit Fn is provided in FIG. 4 and FIG. 5. When the operation result predicting circuit Fn can predicts the above-described data En without carrying out an operation of the subtractor Jn, the operation result predicting circuit Fn determines a selection control signal En without waiting for the completion of the subtractor Jn, and outputs it to the input S of the partial remainder selecting circuit Sn. Thus, the partial remainder selecting circuit Sn can select Rn earlier, so that it determines the logic state of the partial remainder selecting circuit Sn at an earlier stage to allow the consumed power amount due to change of the logic state to be reduced.

Here, the circuit scale of the divider circuit in the Patent Literature 1 is estimated roughly when the bit width of the register which stores the dividend data is 16 bits. First, the register X of 16 bits is configured of 128 elements, supposing that a portion of the register for 1 bit is configured of 8 elements. In the same way, the register Q is configured of 128 elements. Regarding to the partial divider Dn, the circuit scale of the partial divider D14 is estimated in which the circuit scale of the Tn register is the smallest. Because the partial divider D14 contains the register Tn, the subtractor Jn, the operation result predicting circuit Fn and the selector Sn, it is estimated that the circuit scale of the partial divider circuit D14 is about 72 elements. This is, it is configured of 72 elements of 16 elements for 2-bit register Tn, 38 elements for the subtractor Jn (a NOT circuit and a full adder), 14 elements for the predicting circuit Fn (three NOT circuits, one 2-input NAND circuit, and 2-input inverted OR circuit), and 4 elements for the selector Sn (a 2-to-1 selector). Therefore, the circuit scale of the divider circuit in Patent Literature 1 is the register X+the register Q+partial divider circuit Dn×16=128+ 128+1152=1408 (elements).

In the above-mentioned recovery-type divider circuit, when the bit width of the register increases, the circuit scale increases according to a power of an increase rate of the bit width. The reason is in that in the whole configuration of the recovery-type divider circuit shown in FIG. 1, the circuit scale increases with increase of the bit width in each partial divider as well as the number of partial dividers increases with increase of the bit width.

That is, supposing that the circuit scale of the above-mentioned n-bit recovery-type divider circuit is S1, the following equation (1) is met:

$$S1 = \text{(circuit scale of each partial divider in } n\text{-bit divider circuit)} \times n \quad (1)$$

Supposing that the circuit scale of the m-bit recovery-type divider circuit in which the bit width of the register has increased is S2, the following equation (2) is met:

$$S2 = \text{(circuit scale of each partial divider in } m\text{-bit divider circuit)} \times m$$

$$= \text{((circuit scale of each partial divider in } n\text{-bit divider circuit)} \times (m/n)) \times (n \times (m/n))$$

$$= S1 \times (m/n)^2 \quad (2)$$

For example, when n=16 (bits), m=32 (bits), the increasing rate of the circuit scale is $S2 = 1152 \times (32/16)^2 = 4608$ (elements). In this way, the circuit scale of the conventional recovery-type divider circuit increases greatly as the bit width of the register increases.

CITATION LIST

[Patent Literature 1]: JP H07-160479A

SUMMARY OF THE INVENTION

One subject matter of the present invention is in reduction of the circuit scale of a divider circuit in which a dividend is divided by a divisor as a maximum value which can be expressed by bits of a half of a bit width of a register which stores the dividend.

In a first aspect of the present invention, a divider circuit includes: a register which is configured of an even number of bits and in which a dividend data is stored. A shift operation section is configured to acquire a data stored in an upper bit portion of the register when the even number of bits of the register is equally divided to the upper bit portion and a lower bit portion, as a quotient data when the dividend data is divided by a maximum of a divisor data which can be expressed by a half of the even number of bits of the register.

In another aspect of the present invention, a dividing method is achieved by storing dividend data in a register having a bit width of an even number of bits; and by acquiring a data of an upper bit portion of the register by a shift operation section when the even number of bits of the register is equally divided to the upper bit portion and a lower bit portion, as a quotient data when the dividend data is divided by the maximum of a divisor data which can be expressed by a half of the even number of bits of the register.

According to the present invention, the circuit scale of the divider circuit can be reduced in which the dividend is divided by the divisor as the maximum value which can be expressed by the bits of a half of the bit width of the register which stores the dividend.

BRIEF DESCRIPTION OF THE DRAWINGS

FIG. 18 is a diagram showing a relation between a dividend and a divisor in the embodiments of the present invention;

FIG. 19 is a rough estimation of the circuit scale of the divider circuit in the embodiments of the present invention;

FIG. 21 is a block diagram of an alpha blend processing circuit 20 using an equation (28); and FIG. 22 is a block diagram of an image processing apparatus 30 of a sprite method using the alpha blend processing.

DESCRIPTION OF EMBODIMENTS

Hereinafter, a divider circuit of the present invention will be described in detail with reference to the attached drawings.

In the divider circuit according to the present invention, divisor data is determined based on the bit width of a register which stores dividend data. FIG. 18 is a relation between the divisor data and the dividend data in the present invention. The applicability of the divider circuit of the present invention on industry will be described later.

First Embodiment (Configuration)

Figure 6:
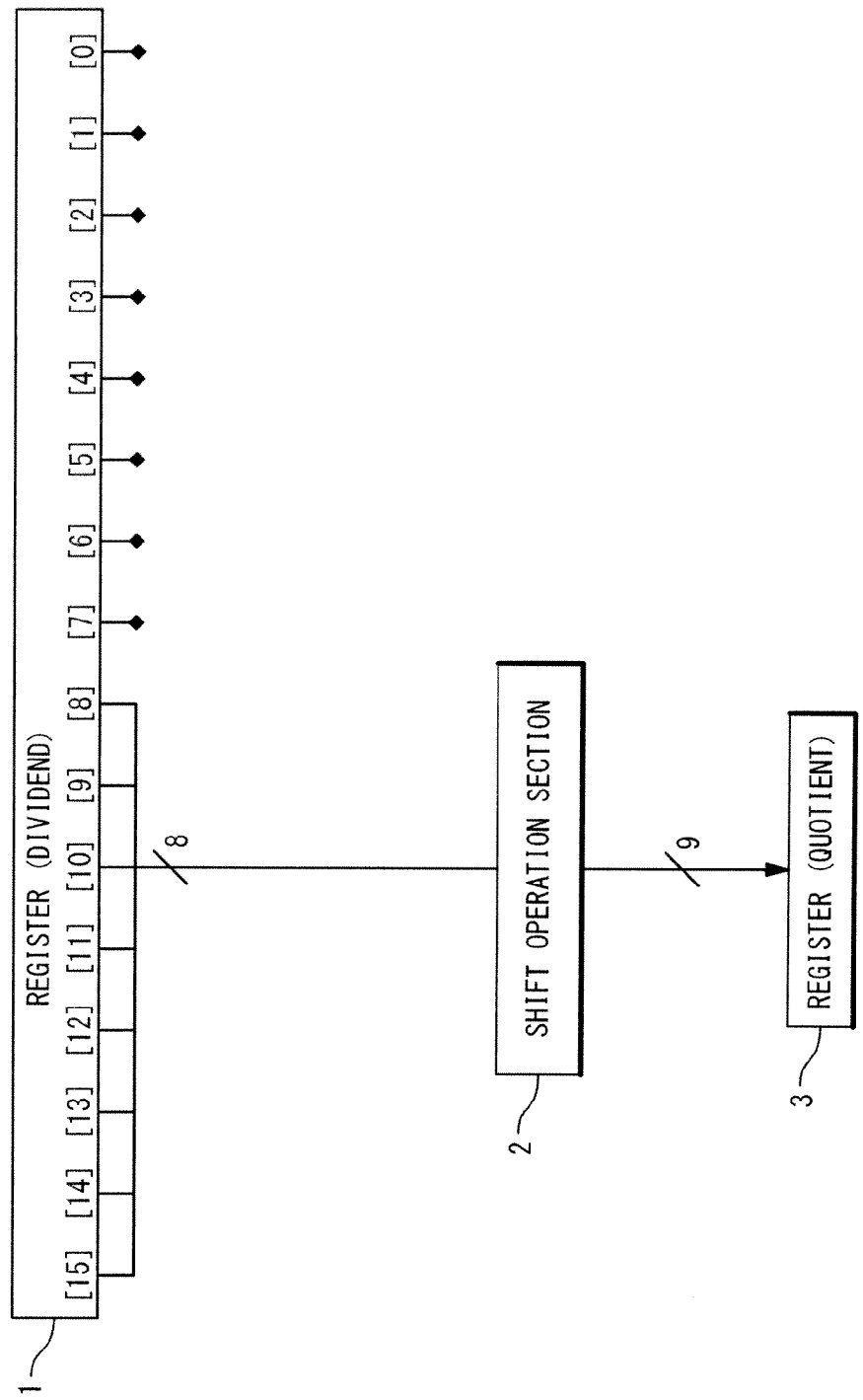
FIG. 6 is a block diagram showing the configuration of a divider circuit according to a first embodiment of the present invention.

First, the configuration of the divider circuit according to a first embodiment of the present invention will be described. FIG. 6 is a block diagram showing the configuration of the divider circuit according to the first embodiment of the present invention. The divider circuit in the first embodiment is provided with a register 1, a shift operation section 2 and a register 3. The register 1 and the shift operation section 2 are connected by a 8-bit signal line. The shift operation section 2 and the register 3 are connected by a 9-bit signal line. In FIG. 6, the register 1 storing the dividend data is a 16-bit in a bit width. However, it is sufficient that the register 1 has the bit width of even number bits, and the bit width thereof is not limited to 16 bits.

The register 1 has a bit width of an even number of bits and stores the dividend data. The shift operation section 2 determines a quotient when the dividend data stored in the register 1 is divided by divisor data as the maximum value which can be expressed by bits of a half of the bit width of the register 1, i.e. a "half-width expressible maximum divisor data", by acquiring the upper bits of the register 1. The upper bits of the above-mentioned register 1 is obtained by separating bits of the register 1 into the upper bits and lower bits so as to have an identical bit width (the data which is identical with the operation result obtained when the dividend data is right-shifted by the number of bits of a half of the bit width of the register 1, i.e. "half-width shifted upper-bit data"). For example, if the register 1 is a 16-bit in a bit width, the half-width expressible maximum divisor data is 8'hFF. Here, "8'" of "8'hFF" means 8 bits and hFF means "FF" in the hexadecimal notation. That is, the divisor data is "255" in the decimal notation. The shift operation section 2 determines as the above-mentioned quotient, the half-width shifted upper-bits data which is identical to the dividend data stored in the register 1 by 8 bits. The register 3 stores the operation result by the shift operation section 2.

(Operation)

Figure 7:
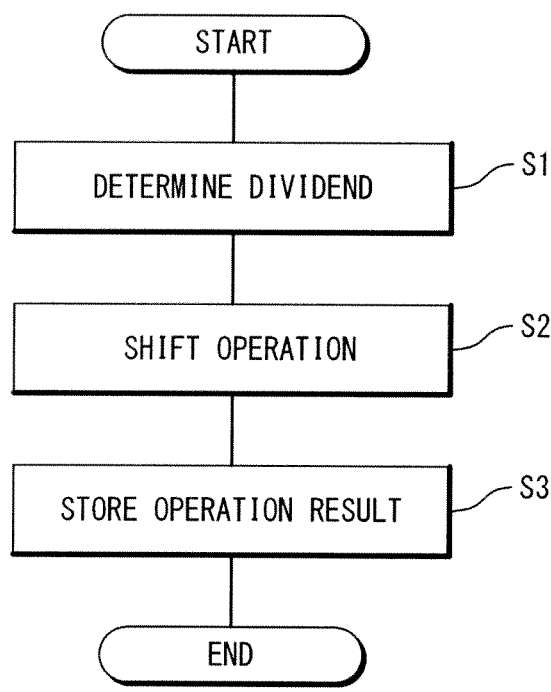
FIG. 7 is a flow chart showing a division method of the divider circuit according to the first embodiment of the present invention.

Next, an operation of the division method of the divider circuit in the first embodiment will be described FIG. 7 is a flow chart of the division method of the divider circuit of the first embodiment of the present invention. A case that the bit width of the register 1 in which the dividend data is stored is 16 bits will be described to facilitate the description. It should be noted that the bit width of the register 1 is not limited to 16 bits, and it is sufficient if it is configured of an even number of bits. The following description is met in the same way, if the bit width of the register 1 is the even number of bits.

(Step S1)

The dividend expressible by 16 bits is stored in the register 1 at a step S1. Then, a processing flow of the divider circuit advances to a step S2.

(Step S2)

First, a symbol used for the description of the register 1 will be described. X[15:0] shows bits from the $0^{th}$ bit (LSB) to the $15^{th}$ bit (MSB) in the register 1. Similarly, X[15:8] shows bits from the $8^{th}$ bit to the $15^{th}$ in the register 1, and X[7:0] shows bits from the $0^{th}$ bit to the $7^{th}$ bit in the register 1.

At the step S2, the shift operation section 2 determines an operation result when the bit data X[15:0] is shifted by 8 bits, by reading the bit data X[15:8] as the 8-bit data from the bit data X[15:0] without giving any influence on the bit data X[7:0]. Because this operation result is a quotient when the dividend data is divided by "256", an error is caused. Then, the processing flow of the divider circuit advances to a step S3.

(Step S3)

The shift operation section 2 stores the operation result at the step S2 in the register 3, and the processing flow of the divider circuit ends.

According to the first embodiment of the present invention, by determining the quotient by the shift operation section 2 which acquires the upper bits of the dividend stored in the register 1 in order to determine the quotient when the dividend is divided by the half-width expressible maximum divisor data, the divider circuit can be attained in which the circuit scale is restrained although an error is caused. The divider circuit according to the first embodiment of the present invention is useful, when the reduction of the circuit scale is required rather than reduction of the error in the division.

Second Embodiment (Configuration)

Figure 8:
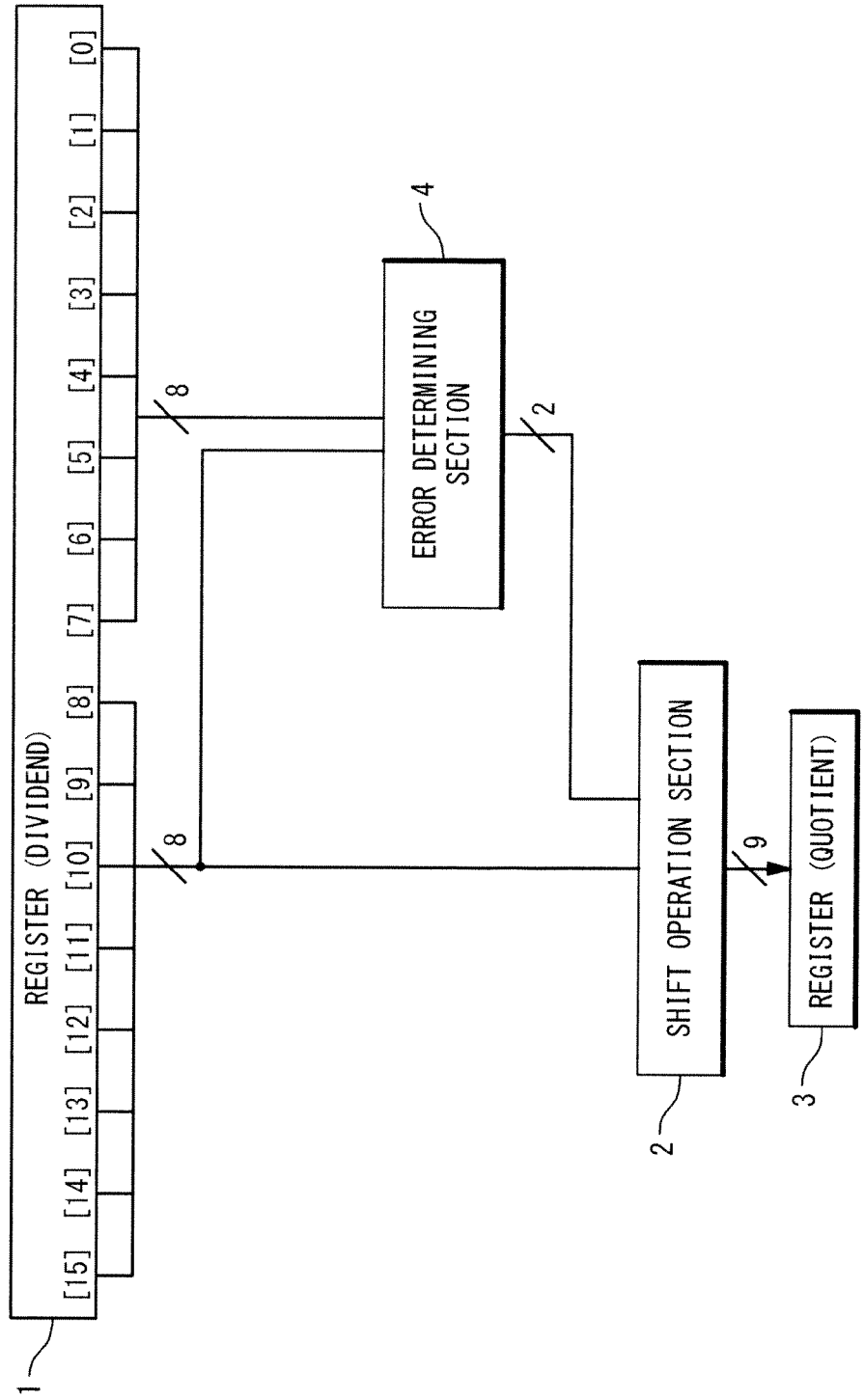
FIG. 8 is a block diagram showing the configuration of the divider circuit according to a second embodiment of the present invention.

Next, the divider circuit according to a second embodiment of the present invention description will be described. FIG. 8 is a block diagram showing the configuration of the divider circuit according to the second embodiment of the present invention. The divider circuit in second embodiment is provided with the register 1, the shift operation section 2, the register 3 and an error determining section 4. The upper 8 bits of the register 1, the shift operation section 2 and the error determining section 4 are connected by a signal line of 8 bits. The lower 8 bits of the register 1 and the error determining section 4 are connected by a signal line of 8 bits. The error determining section 4 and the shift operation section 2 are connected by a signal line of 2 bits. The shift operation section 2 and the register 3 are connected by a signal line of 9 bits. In FIG. 8, the bit width of the register 1 is 16 bits. However, the bit width of the register 1 is not limited to 16 bits, and it is sufficient if it is an even number of bits.

Because the register 1 and the register 3 are same as those of the first embodiment, their description is omitted. The shift operation section 2 determines a data when the dividend data is right-shifted by the number of bits of a half of the bit width of the register 1, i.e. the half-width shifted upper-bits data as the quotient by acquiring the upper bits of the dividend stored in the register 1 when the dividend data is divided by the maximum value which can be expressed by bits of a half of the bit width of the register 1, i.e. the half-width expressible maximum divisor data, like the first embodiment. The shift operation section 2 adds to the quotient, error data (any of 0, 1, and 2) which is supplied to the shift operation section 2 from the error determining section 4. The error determining section 4 determines based on the dividend data, the error data between the upper bits when the dividend data is separated into the upper bits and the lower bits so that the bit width of the upper bits and the bit width of the lower bits are identical (the same data as the operation result when the dividend data is right-shifted by bits of a half of the bit width of the register 1), and the quotient when the dividend data is divided by the half-width expressible maximum divisor data.

(Operation)

Next, the division method of the divider circuit according the second embodiment of the present invention will be described.

Figure 9:
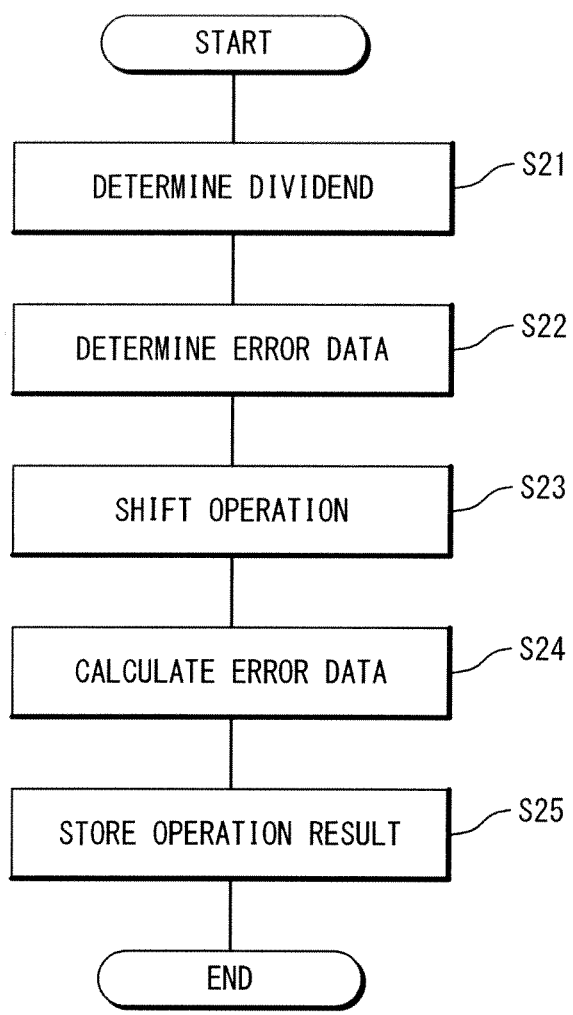
FIG. 9 is a flow chart showing the division method of the divider circuit according to the second embodiment of the present invention.

FIG. 9 is a flow chart of the division method of the divider circuit according to the second embodiment of the present invention. A case that the bit width of the register 1 in which the dividend data is stored is 16 bits will be described for facilitating the description. It should be noted that the bit width of the register 1 is not limited to 16 bits, and is sufficient if it is configured of an even number of bits. The following description is established in the same way if the bit width of the register 1 is an even number of bits.

(Step S21)

The dividend expressible by 16 bits is stored in the register 1 at a step S21. Then, the processing flow of the divider circuit advances to a step S22.

(Step S22)

At the step S22, the error determining section 4 divides the bits of the register 1 into the upper bits and the lower bits so that the bit width of the upper bits and the bit width of the lower bits are identical. Specifically, when 16 bits of the register 1 are shown as X[15:0], the upper bits are shown as X[15:8] and the lower bits are shown as X[7:0].

The error determining section 4 determines error data based on the dividend data. The error data is between the quotient when the dividend data is divided by the half-width expressible maximum divisor data and the bit data X[15:8] as the upper bits of the dividend stored in the register 1 (the bit data identical to the operation result when the dividend data is right-shifted by the number of bits of the half of the bit width of the register 1).

Because it is supposed that the bit width of the register 1 is 16 bits, the half-width expressible maximum divisor data is 8'hFF. Here, "8" of "8'hFF" shows 8-bit data and "hFF" shows that the data is "FF" in the hexadecimal notation. That is, the divisor data is "255" in the decimal notation.

The error determining section 4 determines that error data is "0" if a summation of X[15:8] and X[7:0] is equal to or more than "0" and less than the divisor data ("255").

The error determining section 4 determines that the error data is "1" if a summation of X[15:8] and X[7:0] is equal to or more than the divisor data ("255") and less than of twice (510) of the divisor data.

The error determining section 4 determines that the error data is "2" if the summation of X[15:8] and X[7:0] is equal to twice (510) of the divisor data.

The error determining section 4 outputs the determined error data to the shift operation section 2.

The reason why the error data can be determined as mentioned above will be described later. The processing flow of the divider circuit advances to a step S23.

(Step S23)

At the step S23, the shift operation section 2 determines the operation result when the bit data X[15:0] is shifted by 8 bits, by reading the bit data X[15:8] as 8-bit data from the bit data X[15:0] without any influence. The processing flow of the divider circuit advances to a step S24.

(Step S24)

At the step S24, the shift operation section 2 adds the error data (any of 0, 1, and 2) determined by the error determining section 4 to the operation result at the step S23. The processing flow of the divider circuit advances to a step S25.

(Step S25)

At the step S25, the shift operation section 2 stores the operation result at the step S24 in the register 3 and the processing flow of the divider circuit ends.

In the second embodiment of the present invention, the shift operation section 1 of the first embodiment is improved so that error of the quotient when the division is substituted by the shift operation is corrected. According to the second embodiment of the present invention, although the circuit scale increases more than the divider circuit of the first embodiment, the error of the quotient generated when the division is substituted by the shift operation can be cancelled.

The reason why the error determining section 4 can calculate the error data by the method at the step S22 will be described. To facilitate the description, a case that the bit width of the register 1 in which the dividend data is stored is 16 bits will be described. The following description is established in the same way, if the bit width of the register 1 is an even number of bits.

Supposing that the error data between the operation result of the right shift operation and the division result is T01, the following equation is met:

$$T01=(X[15:0]\div 8'hFF)-(X[15:0]>>8) \qquad (3)$$

Here, X[15:0]>>8 shows the 8-bit right shift of the dividend data in the register 1.

X[15:0] can show by the following equation by using the bit data X[15:8] as the upper bits and the bit data X[7:0] as the lower bits.

$$X[15:0]=X[15:8]\times 9'h100+X[7:0] \qquad (4)$$

Also, because an overflow bit is cut off in the right shift operation, X[15:0]>>8 can be shown by the following equation.

$$X[15:0]>>8=X[15:8] \qquad (5)$$

When substituting the equations (4) and (5) into the equation (3), the following equation is obtained:

$$T01=((X[15:8]\times 9'h100+X[7:0])\div 8'hFF)-X[15:8] \qquad (6)$$

When multiplying "8'hFF" to both sides of the equation (6), the following equation (7) is obtained:

$$T01\times 8'hFF=(X[15:8]\times 9'h100+X[7:0])-X[15:8]\times 8'hFF \qquad (7)$$

Moreover, the following equation (8) is obtained from the equation (7):

$$T01=(X[15:8]+X[7:0])/8'hFF \qquad (8)$$

Here, the following equation (9) is met for X[15:8]+X[7:0].

$$9'h000<=X[15:8]+X[7:0]<9'h1FE \qquad (9)$$

Therefore, from the equations (8) and (9), the value of T01 can be determined to be any of the following three cases based on a range of X[15:8]+X[7:0]. That is, the value T01 can be determined to be "0" in case of $$9'h000<=X[15:8]+X[7:0]<9'h0FF \qquad (10)$$

T01 can be determined to be "1" in case of $$9'h0FF<=X[15:8]+X[7:0]<9'h1FE \qquad (11)$$

T01 can be determined to be "2" in case of $$9'h1FE=X[15:8]+X[7:0] \qquad (12)$$

Figure 17:
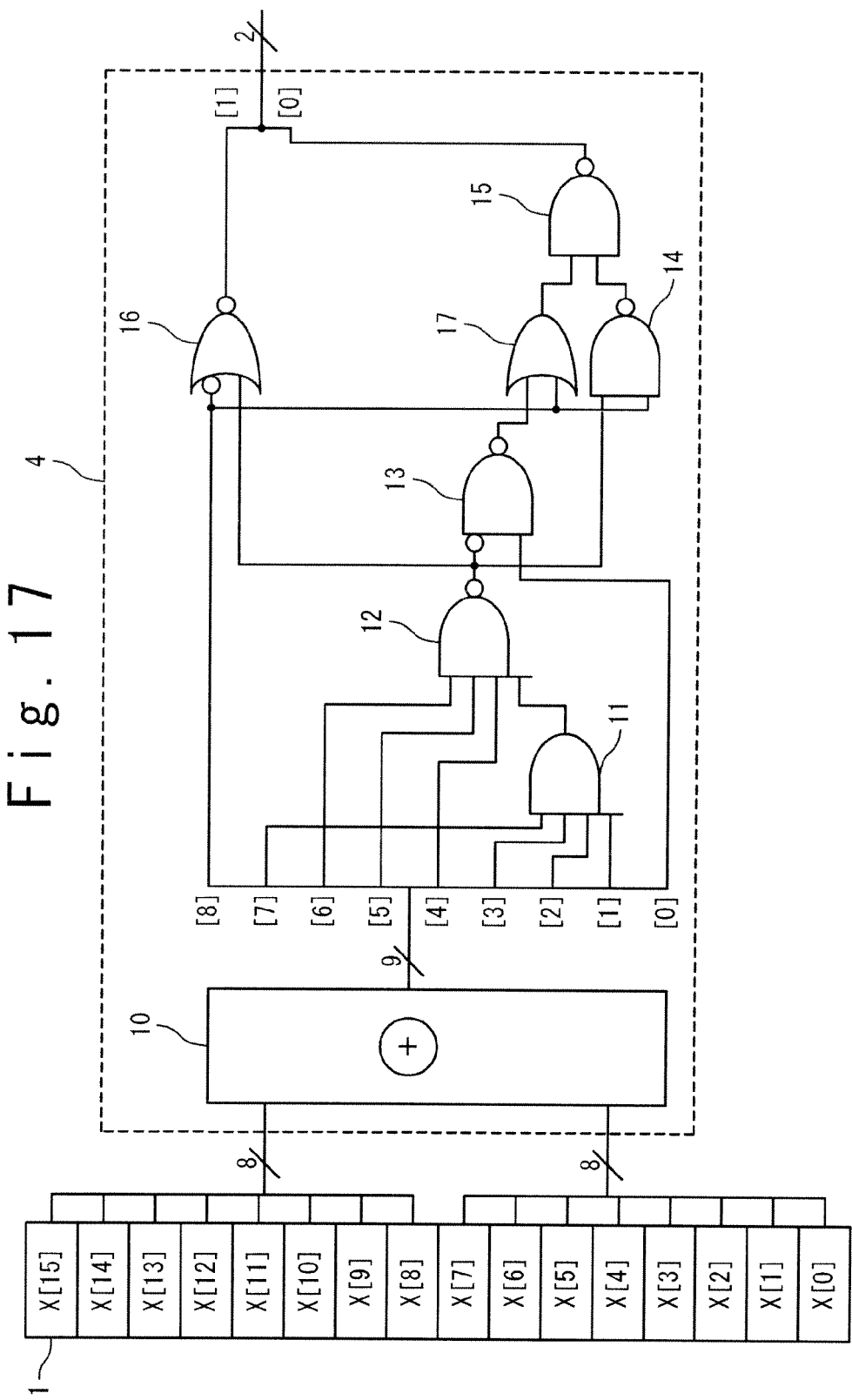
FIG. 17 is a block diagram showing an error determining section 4 in the embodiments of the present invention.

The reason why the error data can be calculated by the method at the step S22 has been described. FIG. 17 is a block diagram showing the error determining section 4 in the second embodiment of the present invention.

Third Embodiment (Configuration)

Figure 10:
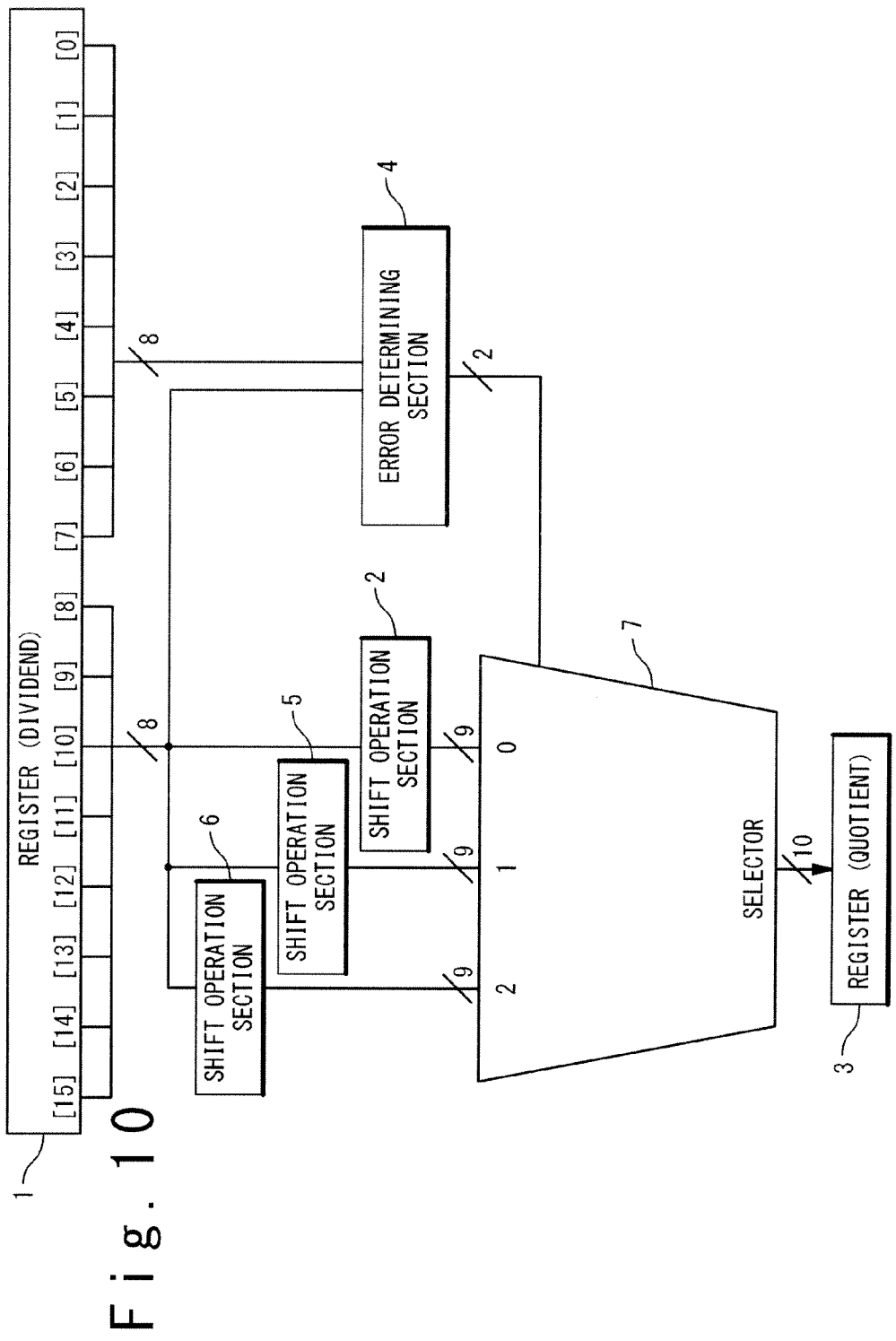
FIG. 10 is a block diagram showing the configuration of the divider circuit according to a third embodiment of the present invention.

Next, the configuration of the divider circuit according to a third embodiment of the present invention will be described. FIG. 10 is a block diagram showing the configuration of the divider circuit according to a third embodiment of the present invention. The divider circuit in the third embodiment is provided with the register 1, the shift operation section 2, the register 3, the error determining section 4, a shift operation section 5, a shift operation section 6 and a selector 7. The upper 8 bits of the register 1, and the shift operation section 2, the shift operation section 5, the shift operation section 6 and the error determining section 4 are connected by a signal line of 8 bits. The lower 8 bits of the register 1 and the error determining section 4 are connected by a signal line of 8 bits. The shift operation section 2 and the selector 7 are connected by a signal line of 9 bits. The shift operation section 5 and the selector 7 are connected by a signal line of 9 bits. The shift operation section 6 and the selector 7 are connected by a signal line of 9 bits. The error determining section 4 and the selector 7 are connected by a signal line of 2 bits. The selector 7 and the register 3 are connected by a signal line of 9 bits. In FIG. 10, the bit width of the register 1 is 16 bits. However, the bit width of the register 1 is not limited to 16 bits, and it is sufficient if it is an even number of bits.

Because the register 1, the register 3 and the error determining section 4 are same as those of the second embodiment, the description thereof is omitted.

The shift operation section 2 calculates and determines data of the above-mentioned upper bits of the register 1 as a quotient. The shift operation section 5 calculates data of an addition result of the above-mentioned upper bits of the register 1 and "1" as the quotient. The shift operation section 6 calculates data of an addition result of the above-mentioned upper bits of the register 1 and "2" as the quotient.

The selector 7 selects any of the operation result of the shift operation section 2, the operation result of the shift operation section 5 and the operation result of the shift operation section 6 based on the error data determined by the error determining section 4.

(Operation)

Next, the division method of the divider circuit according to the third embodiment of the present invention will be described.

Figure 11:
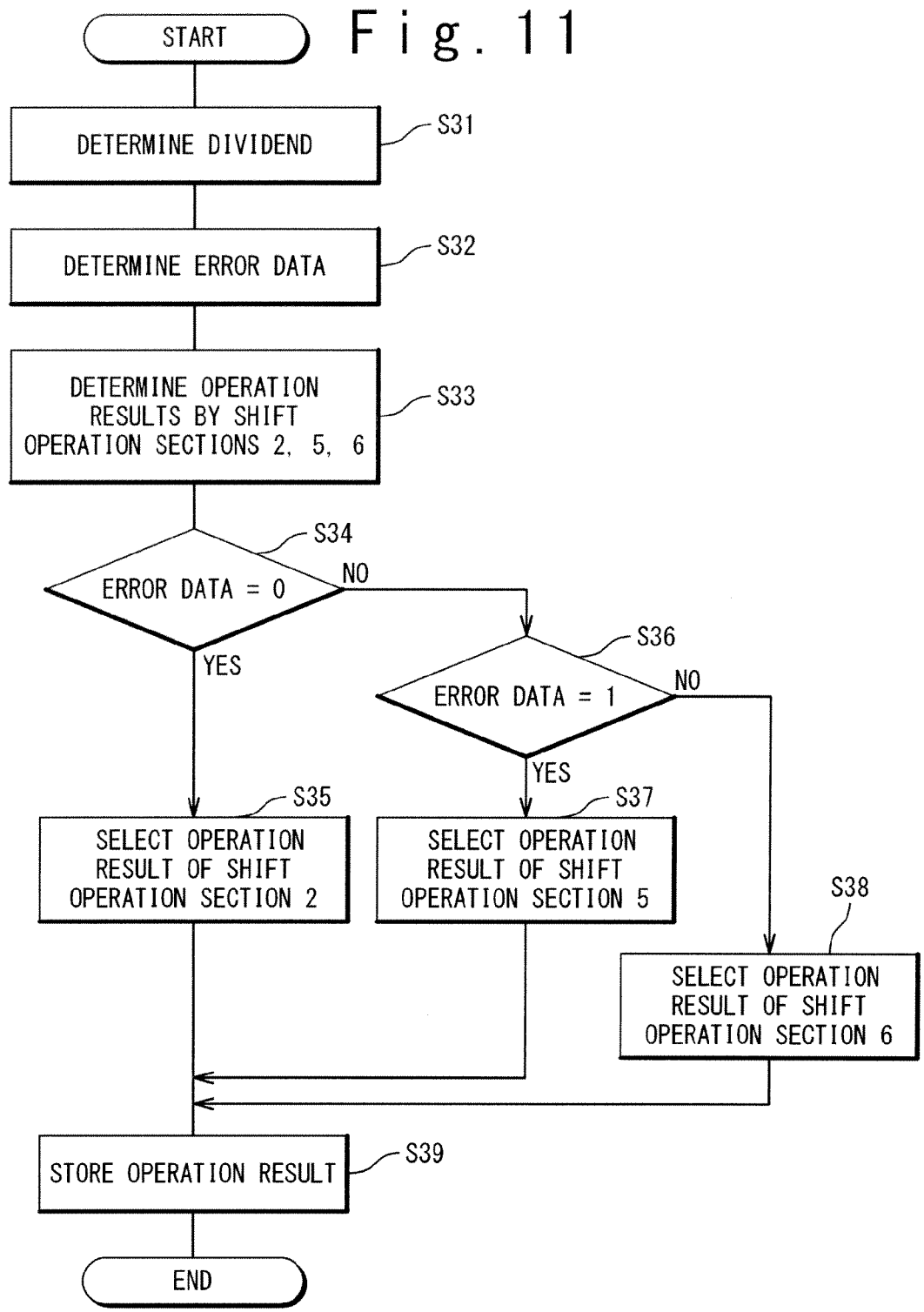
FIG. 11 is a flow chart showing the division method of the divider circuit according to the third embodiment of the present invention.

FIG. 11 is a flow chart of the division method of the divider circuit according to the third embodiment of the present invention. To facilitate the description, a case that the bit width of the register 1 is 16 bits will be described. It should be noted that the bit width of the register 1 is not limited to 16 bits, and it is sufficient if it is an even number of bits. The following description is established in the same way when the bit width of the register 1 is an even number of bits.

(Step S31)

The dividend expressible by 16 bits is stored in the register 1 at a step S31. Then, the processing flow of the divider circuit advances to a step S32.

(Step S32)

The error determining section 4 determines based on the dividend data, error data between the bit data X[15:8] which is the upper bits of the register 1 (the data which is identical to a data obtained when the dividend data is right-shifted by the number of bits of a half of the bit width of the register 1, i.e. the half-width shifted upper-bits data, as the operation result) and the quotient when the dividend data is divided by the maximum value which can be expressed by bits of a half of the bit width of the register 1, i.e. the half-width expressible maximum divisor data.

Because the bit width of the register 1 is 16 bits, the divisor data as the half-width expressible maximum divisor data is "8'hFF". Here, "8'" of "8'hFF" shows 8 bits and "hFF" shows "FF" in the hexadecimal notation. That is, the divisor data becomes "255" in the decimal notation.

The error determining section 4 determines error data to be "0" if a summation of the bit data of X[15:8] and the bit data of X[7:0] is equal to or more than "0" and less than the divisor data ("255").

The error determining section 4 determines error data to be "1" if the summation of the bit data of X[15:8] and the bit data of X[7:0] is equal to or more than the divisor data ("255") and less than twice (510) of the divisor data.

The error determining section 4 determines error data to be "2" if the summation of the bit data of X[15:8] and the bit data of X[7:0] is equal to twice (510) of the divisor data.

The reason why the error data is determined as above-mentioned is as mentioned above. The processing flow of the divider circuit advances to a step S33.

(Step S33)

At the step S33, the shift operation section 2 determines the operation result when the bit data X[15:0] is shifted by 8 bits, by reading the bit data of X[15:8] as the 8-bit data from the bit data of X[15:0] independently.

The shift operation section 5 determines the operation result when the bit data of X[15:0] is shifted by 8 bits by reading the bit data of X[15:8] as the 8-bit data from the bit data of X[15:0], independently and adds "1" to this operation result.

The shift operation section 6 determines the operation result when the bit data of X[15:0] is shifted by 8 bits by reading the bit data of X[15:8] as the 8-bit data from the bit data of X[15:0] independently, and adds "2" to this operation result. The processing flow of the divider circuit advances to a step S34.

(Step S34)

At the step S34, the selector 7 confirms whether or not the error data is "0". The processing flow of the divider circuit advances to a step S35 when the error data is "0", and advances to a step S36 when the error data is not "0".

(Step S35)

At the step S35, the selector 7 selects the operation result calculated by the shift operation section 2 at the step S33 as the quotient when the dividend data stored in the register 1 is divided by the half-width expressible maximum divisor data. Then, the processing flow of the divider circuit advances to a step S39.

(Step S36)

At the step S36, the selector 7 confirms whether or not the error data is "1". The processing of the divider circuit advances to step S37 when the error data is "1", and advances to step S38 when the error data is not "1".

(Step S37)

The selector 7 selects the operation result calculated by the shift operation section 5 at the step S33 as the quotient when the dividend data stored in the register 1 is divided by the half-width expressible maximum divisor data. The processing flow of the divider circuit advances to a step S39.

(Step S38)

The selector 7 selects the operation result calculated by the shift operation section 6 at the step S33 as the quotient when the dividend data stored in the register 1 is divided by the half-width expressible maximum divisor data. The processing flow of the divider circuit advances to a step S39.

(Step S39)

The selector 7 stores the operation result selected at any of the step S35, the step S37 and the step S38 in the register 3. The processing flow of the divider circuit ends.

One feature of the third embodiment of the present invention is in that the error correction processing of the shift operation section 2 according to the second embodiment of the present invention is divides into the shift operation section 2, the shift operation section 5, and the shift operation section 6. By the selector 7, the quotient is selected.

Fourth Embodiment (Configuration)

Figure 12:
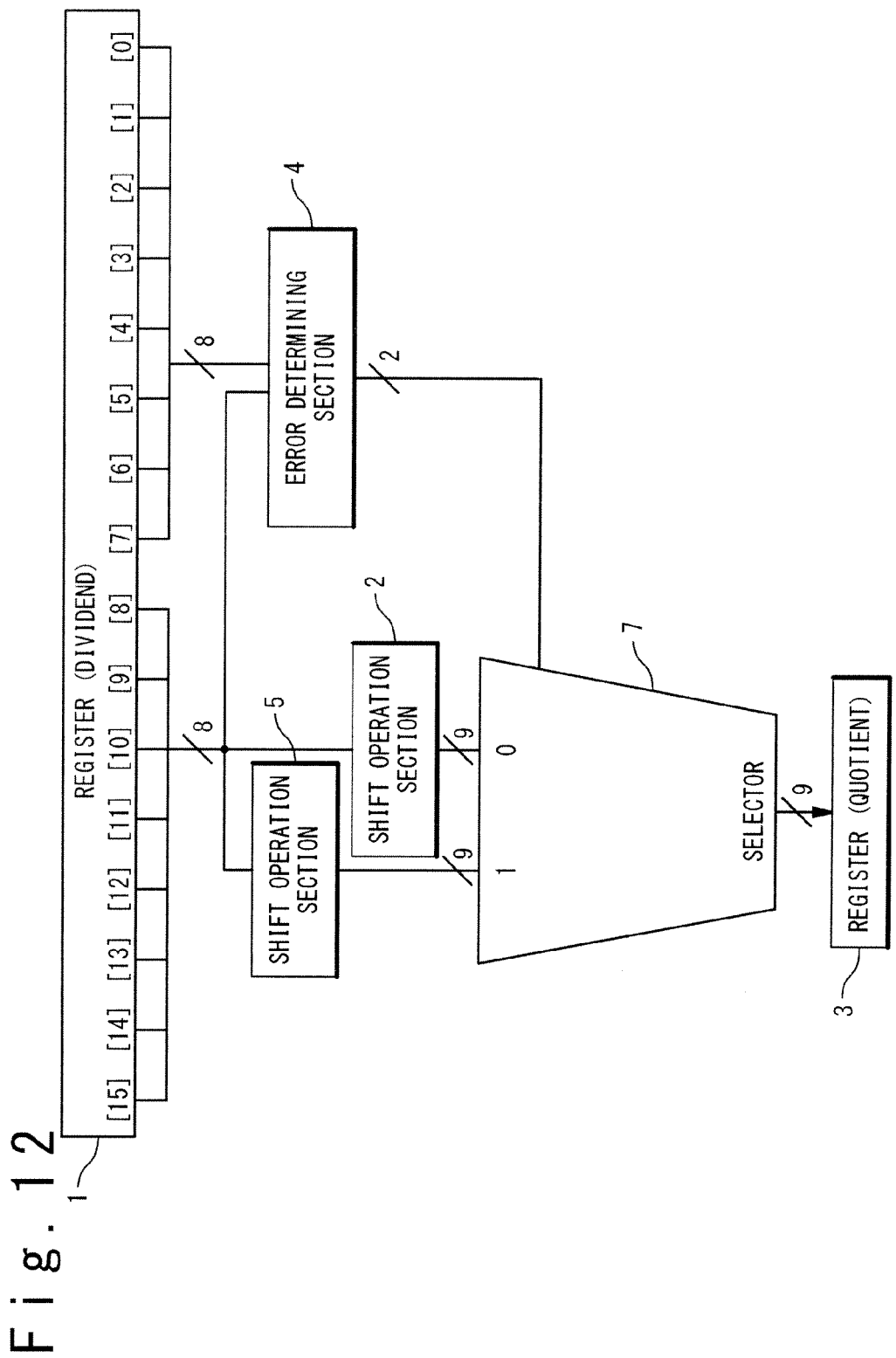
FIG. 12 is a block diagram showing the configuration of the divider circuit according to a fourth embodiment of the present invention.

The fourth embodiment in which a part of the third embodiment of the present invention is changed will be described. FIG. 12 is a block diagram showing the configuration of the divider circuit according to the fourth embodiment of the present invention. In FIG. 12, the bit width of the register 1 is 16 bits. However, the bit width of the register 1 is not limited to 16 bits, and it is sufficient if it is an even number of bits. The difference of the present embodiment from the third embodiment of the present invention is in that there is not the shift operation section 6. Because the description of the other configuration and operation is same as that of the third embodiment of the present invention, the detailed description is omitted.

When the dividend data does not meet the equation (12) (for example, when the register 1 is 16 bits or when the data stored in the register 1 is not "hFFFF"), not the third embodiment but the fourth embodiment can be applied, because the operation processing in case of the error data of "2" can be omitted.

Fifth Embodiment (Configuration)

Figure 13:
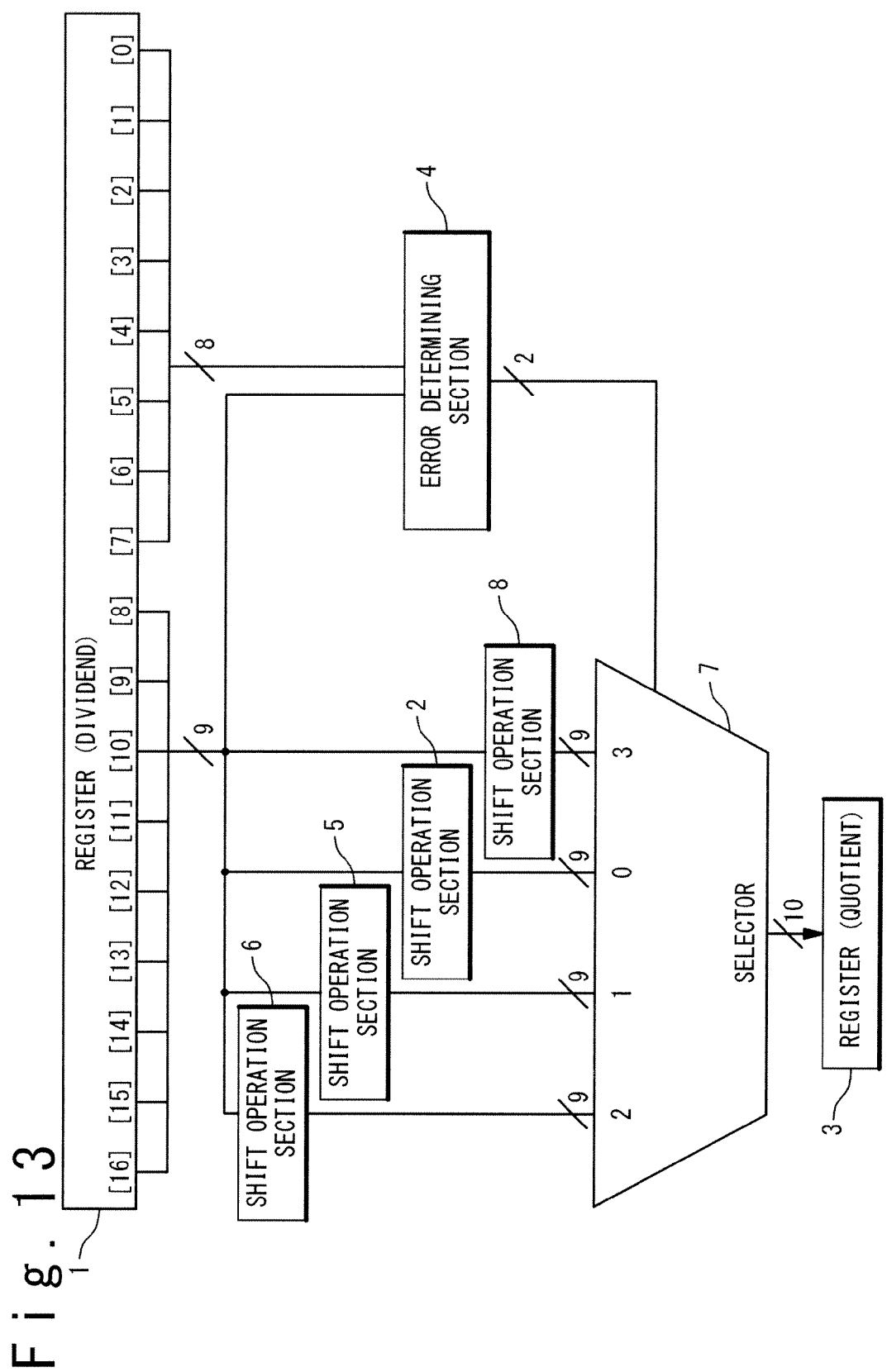
FIG. 13 is a block diagram showing the configuration of the divider circuit according to a fifth embodiment of the present invention.

Next, the configuration of the divider circuit according to a fifth embodiment of the present invention will be described. FIG. 13 is a block diagram showing the configuration of the divider circuit according to the fifth embodiment of the present invention. The divider circuit in the fifth embodiment is provided with the register 1, the shift operation section 2, the register 3, the error determining section 4, the shift operation section 5, the shift operation section 6, the selector 7 and a shift operation section 8. The uppers 9 bits of the register 1, the shift operation section 2, the shift operation section 5, the shift operation section 6, the error determining section 4 and the shift operation section 8 are connected by a signal line of 9 bits. The lower 8 bits of the register 1 and the error determining section 4 are connected by a signal line of 8 bits. The shift operation section 2 and the selector 7 are connected by a signal line of 9 bits. The shift operation section 5 and the selector 7 are connected by a signal line of 9 bits. The shift operation section 6 and the selector 7 are connected by a signal line of 9 bits. The shift operation section 8 and the selector 7 are connected by the signal line of 9 bits. The error determining section 4 and the selector 7 are connected by a signal line of 2 bits. The selector 7 and the register 3 are connected by a signal line of 10 bits. In FIG. 13, although the bit width of the register 1 is 17 bits, the bit width of the register 1 is not limited to 17 bits, and it is sufficient if it is an even number of bits, excluding a sign bit.

The dividend data is stored in the register 1 in the consideration of a negative value. The MSB of the register 1 is used as the sign bit and the number of bits of the register 1 except for the MSB is an even number. The quotient selected by the selector 7 is stored in the register 3.

The shift operation section 2 calculates the data of the upper 9 bits of the register 1 as the quotient. The shift operation section 5 calculates an addition result of the upper 9 bits of the register 1 and "1" as the quotient. The shift operation section 6 calculates an addition result of the upper 9 bits of the register 1 and "2" as the quotient. The shift operation section 8 calculates an addition result the upper 9 bits of the register 1 and "−1" as the quotient.

The error determining section 4 determines error data between data of the uppers 9 bits of the register 1 (data which is identical to the operation result obtained by right-shifting the dividend data in the register 1 in by 8 bits) and the quotient when the dividend data is divided by the maximum value which can be expressed by bits of a half of the bit width of the register 1, i.e. the half-width expressible maximum divisor data based on the dividend data.

The selector 7 selects one operation result from the operation results of the shift operation section 2, the shift operation section 5, the shift operation section 6 and the shift operation section 8, based on the error data determined by the error determining section 4.

(Operation)

The method of the operation in the present embodiment is same as that of the third embodiment, excluding the point that the negative dividend data is taken into consideration. Because the negative dividend data is taken into consideration, the present embodiment is different from the third embodiment in that a conditional equation used to determine the error data by the error determining section 4 is changed and that the shift operation section 8 is added. Because the other operation method is same as that of the third embodiment, the detailed description is omitted.

First, the conditional equation used to determine the error data by the error determining section 4 will be described. Supposing that the error data between the operation result by the right shift operation and the division result is T01, the following equation is met:

$$T01=(X[16:0]/8'hFF)-(X[16:0]>>8) \quad (13)$$

The equation (13) can be expressed by the following equation (14) in the same way as the equation (6):

$$T01=((X[16] \times 17'h10000+X[15:8] \times 9'h100$$

$$+X[7:0])/8'hFF)-(X[16] \times 9'h100+X[15:8]) \quad (14)$$

When both sides of the equation (14) are multiplied by "8'hFF", the following equation (15) is met:

$$T01 \times 8'hFF = (X[16] \times 17'h10000+X[15:8] \times 9'h100+X[7:0])$$

$$-(X[16] \times 9'h100+X[15:8]) \times 8'hFF \quad (15)$$

Here, because X[16] is "0" or "1", the following equation is met:

$$X[16] \times 17'h10000-(X[16] \times 9'h100) \times 8'hFF$$

$$=X[16] \times 9'h100 \quad (16)$$

Therefore, in the same way as the equation (8) is derived, the following equation (17) is obtained:

$$T01 \times 8'hFF=X[16] \times 9'h100+X[15:8]+X[7:0] \quad (17)$$

Here, considering that X[16]×9' h100 be "0" or "256", and a range which X[15:8]+X[7:0] can take, the error T01 can be determined to be "0" to "2" from the conditional equations (10) to (12) when the dividend data is positive, (in case of X[16]=0). Also, the error T01 can be determined by separating into the following cases, when the dividend data is negative, (in case of X[16]=1):
T01 can be determined to be "−1" in case of $$X[15:8]+X[7:0]<=10'h001 \qquad (18),$$

T01 can be determined to be "0" in case of $$10'h001<X[15:8]+X[7:0]<=10'h100 \qquad (19).$$

T01 can be determined to be "1" in case of $$10'h100<X[15:8]+X[7:0]<=10'h1FF \qquad (20)$$

T01 can be determined to be "2" in case of $$10'h1FF<X[15:8]+X[7:0]<=10'h2FE \qquad (21)$$

If the sign bit X[16] is used to set the conditional expression to determine the error data regardless of whether the dividend data is positive or negative, the equations (10) to (12) and (18) to (21) can be aggregated to the following four conditional equations:
T01 can be determined to be "−1" in case of $$X[15:8]+X[7:0]-X[16]\times 2<10'h000 \qquad (22)$$

T01 can be determined to be "0" in case of $$10'h000<=X[15:8]+X[7:0]-X[16]\times 2<10'h0FF \qquad (23)$$

T01 can be determined to be "1" in case of $$10'h0FF<=X[15:8]+X[7:0]-X[16]\times 2<10'h1FE \qquad (24)$$

T01 can be determined to be "2" in case of $$10'h1FE=X[15:8]+X[7:0]-X[16]\times 2 \qquad (25)$$

In the error determining section 4 of the present embodiment, the error data can be determined by using the equations (22) to (25). The shift operation section 8 corrects the error data in case of not-generated error T01=−1, when the dividend data is positive.

As mentioned above, according to the present embodiment, the right division result can be obtained even when the dividend data is negative.

Sixth Embodiment

Figure 14:
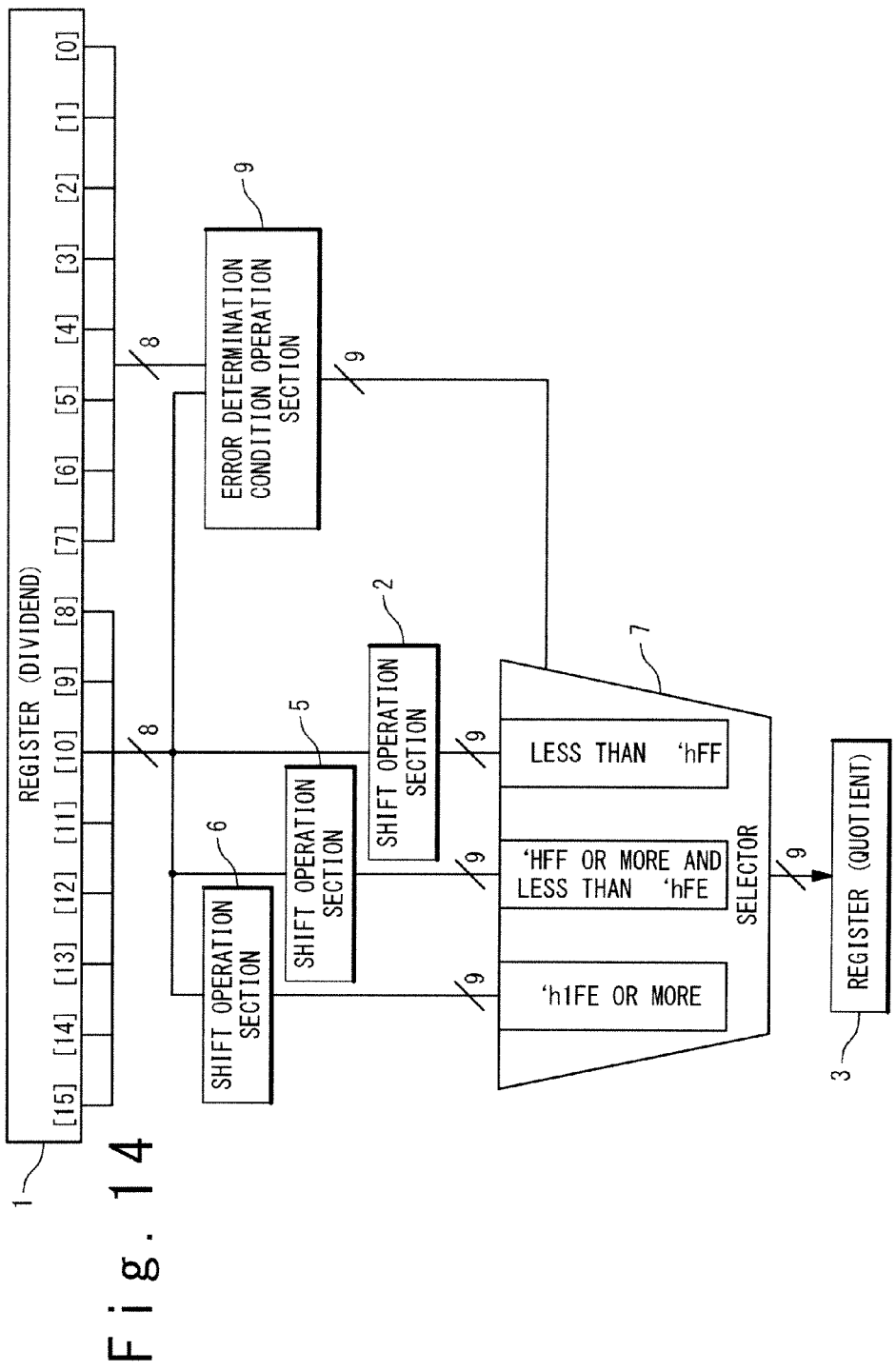
FIG. 14 is a block diagram showing the configuration of the divider circuit according to a sixth embodiment of the present invention.

A sixth embodiment in which a part of the third embodiment is changed will be described. FIG. 14 is a block diagram showing the configuration of the divider circuit according to the sixth embodiment of the present invention. The bit width of the register 1 is 16 bits in FIG. 14. However, the bit width of the register 1 is not limited to 16 bits, and it is sufficient if it is an even number of bits. The difference of the present embodiment of the present invention from the third embodiment is in that the error determining section 4 is changed to an error determination condition operation section 9 and operation result selection processing of the selector 7. Because the description of the other configuration and operation is same as that of the third embodiment of the present invention, the detailed description is omitted.

The error determination condition operation section 9 calculates a summation of the bit data of X[15:8] and the bit data of X[7:0] and outputs to the selector 7.

The selector 7 selects any of the operation results of the shift operation section 2, the shift operation section 5 and the shift operation section 6 to output to the register 3, based on the summation of the bit data of X[15:8] and the bit data of X[7:0] calculated by the error determination condition operation section 9.

The sixth embodiment of the present invention is different from the third embodiment in that the error data (0, 1 or 2) is not calculated by the error determination condition operation section 9, and that which the summation of the bit data of X[15:8] and the bit data of X[7:0], calculated by the error determination condition operation section 9 is used for the selection condition of the quotient in the selector 7.

Figure 15:
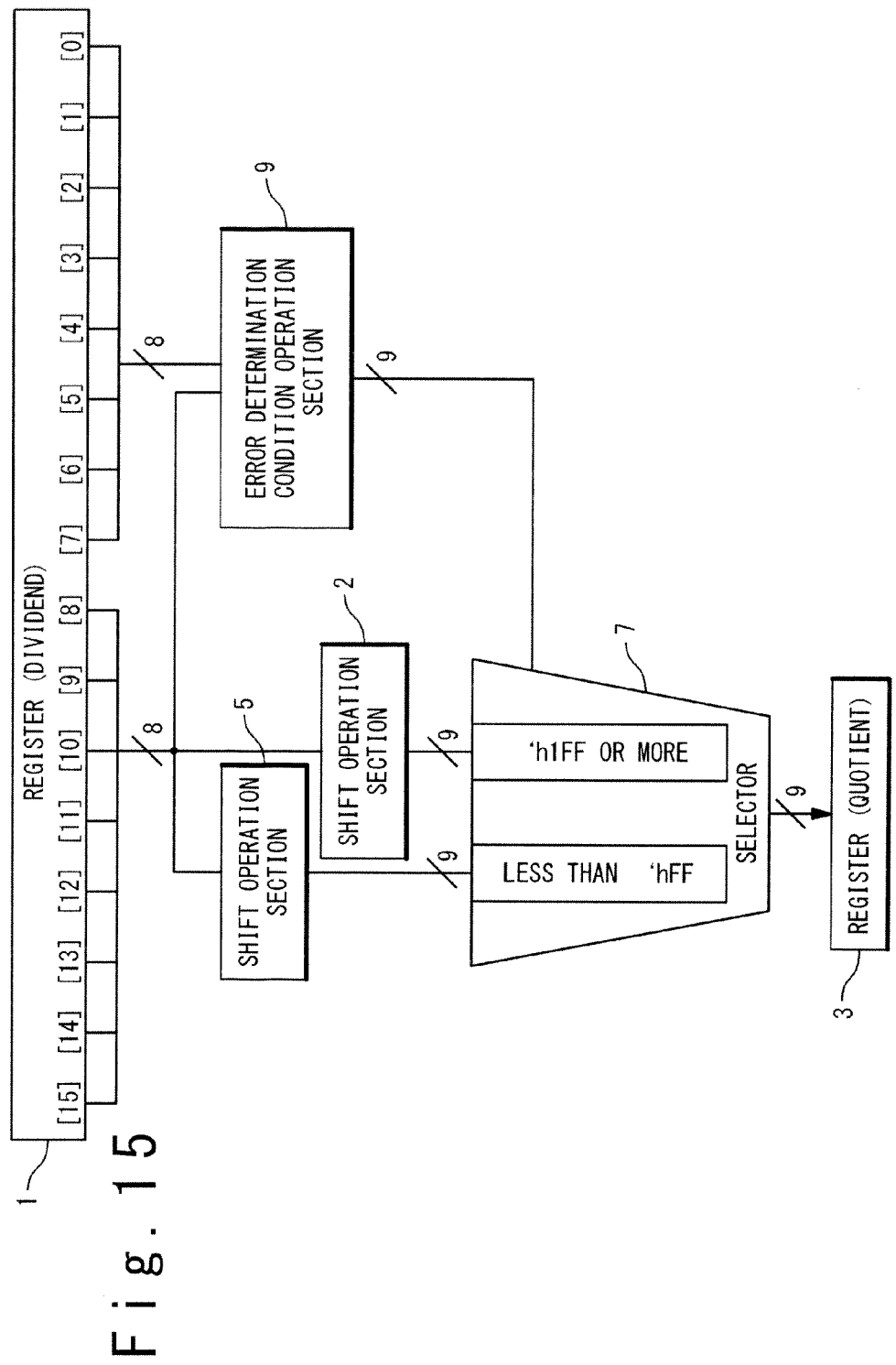
FIG. 15 is a block diagram showing the configuration of the divider circuit according to a seventh embodiment of the present invention.

Seventh Embodiment (Configuration)
A seventh embodiment of the present invention in which a part of the sixth embodiment is changed will be described. FIG. 15 is a block diagram showing the configuration of the divider circuit according to the seventh embodiment of the present invention. The bit width of the register 1 is 16 bits in FIG. 15. The bit width of the register 1 is not limited to 16 bits, and it is sufficient if it is of an even number of bits. The difference of the seventh embodiment of the present invention from the sixth embodiment is in hat there is not the shift operation section 6. Because the description of the other configuration and operation is same as that of the sixth embodiment, the detailed description is omitted.

When the dividend data does not meet the equation (12) (for example, when the data stored in the register 1 is not "hFFFF" in case that the bit width of the register 1 is 16 bits), not the sixth embodiment but the seventh embodiment can be applied because the operation processing in case of the error data of "2" can be omitted.

Figure 16:
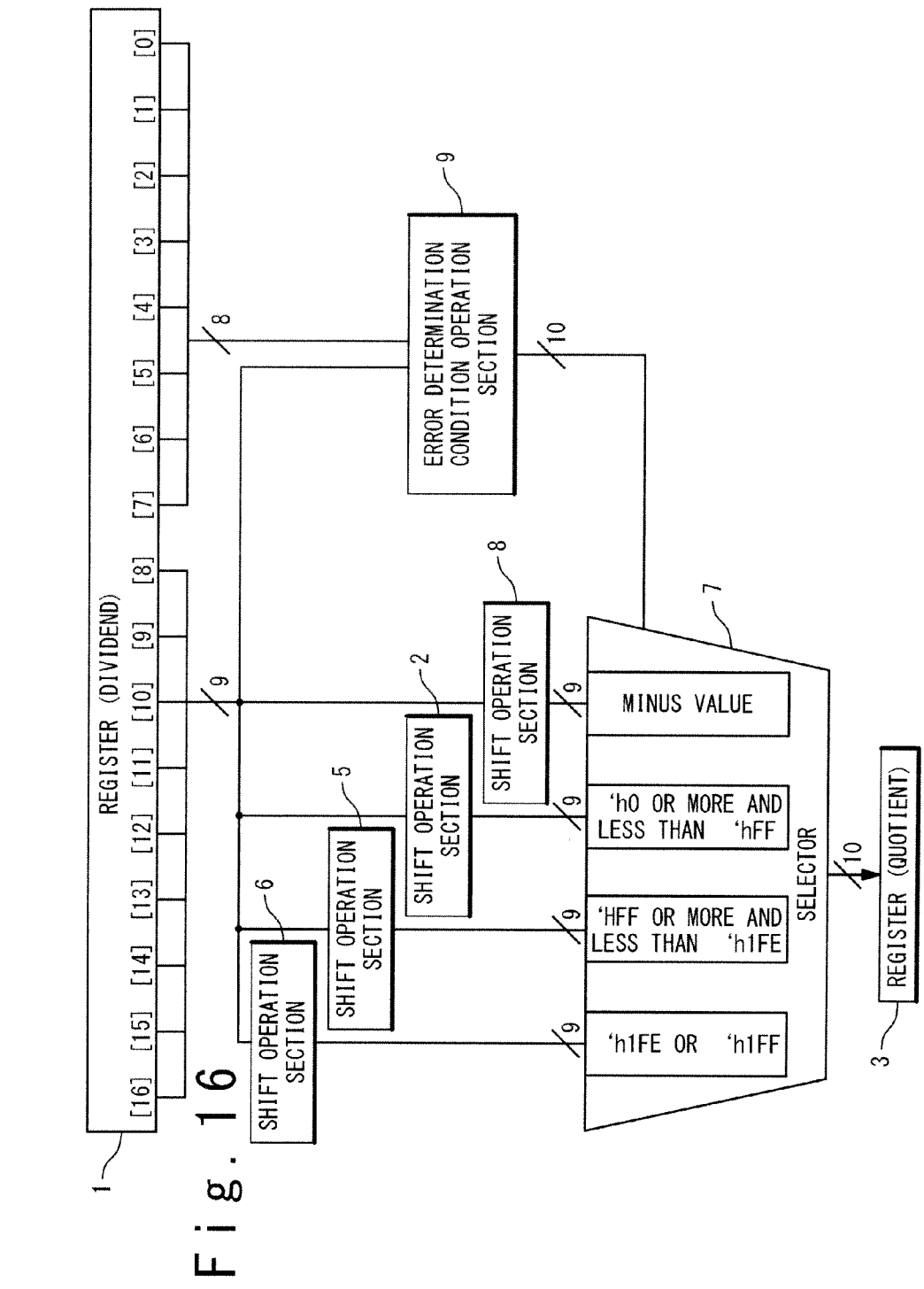
FIG. 16 is a block diagram showing the configuration of the divider circuit according to an eighth embodiment of the present invention.

Eighth Embodiment (Configuration)
An eighth embodiment of the present invention in which a part of the fifth embodiment is changed will be described. FIG. 16 is a block diagram showing the configuration of the divider circuit according to the eighth embodiment of the present invention. The bit width of the register 1 is 17 bits in FIG. 16. However, the bit width of the register 1 is not limited to 17 bits, and it is sufficient if it is an even number of bits except for the sign bit. The difference of the eighth embodiment of the present invention from the fifth embodiment in that the error determining section 4 is changed to the error determination condition operation section 9 and that the operation result selection processing of the selector 7 is changed. Because the description of the other configuration and operation is same as that of the fifth embodiment in the present invention, the detailed description is omitted.

The error determination condition operation section 9 determines (X[15:8]+X[7:0])−(X[16]×2) and outputs it to the selector 7.

The selector 7 selects one of the operation results of the shift operation section 2, the shift operation section 5, the shift operation section 6 and the shift operation section 8 based on (X[15:8]+X[7:0])−(X[16]×2) calculated by the error determination condition operation section 9, to output to the register 3.

The eighth embodiment of the present invention is different from the fifth embodiment in that the error data (−1, 0, 1 or 2) is not calculated by the error determination condition operation section 9, and that the data of (X[15:8]+X[7:0])−(X[16]×2) calculated by the error determination condition operation section 9 is used for the selection condition of the quotient by the selector 7.

Next, the circuit scale of the divider circuit in the present embodiment will be described. FIG. 19 is a rough estimation result of the circuit scale of the divider circuit in the present invention. In FIG. 19, the circuit scale estimation is carried out based on the number of elements.

First, the circuit scale of the first embodiment of the present invention will be described. Because the register 1 has the bit width of 16 bits, the register 1 is configured of 128 elements, supposing that a portion of 1 bit is configured of 8 elements. Because the shift operation section 2 can be realized by acquiring the upper 8-bit data of the register 1, the shift operation section 2 is configured of 0 elements. Because the register 3 has the bit width of 9 bits, the register 3 is configured of 72 elements. Therefore, the circuit scale of the first embodiment is 200 elements in total.

Next, the circuit scale of the second embodiment of the present invention will be described. Because the register 1 has the bit width of 16 bits, the register 1 is estimated to be configured of 128 elements, supporting that the portion of 1 bit is configured of 8 elements. The shift operation section 2 is estimated to be configured of 140 elements as a logic circuit. Because the register 3 has the bit width of 9 bits, the register 3 is estimated to be configured of 72 elements. The error determining section 4 is estimated to be configured of 104 elements as the logic circuit. Therefore, the circuit scale of the second embodiment is estimated to be configured of 444 elements in total.

Next, the circuit scale of the third embodiment of the present invention will be described. Because the register 1 has the bit width of 16 bits, the register 1 is estimated to be configured of 128 elements, supporting that the portion of 1 bit is configured of 8 elements. Because the shift operation section 2 can be realized by acquiring the upper 8-bit data of the register 1, the shift operation section 2 is estimated to be configured of 0 elements. Because the register 3 has the bit width of 9 bits, the register 3 is estimated to be configured of 72 elements. The error determining section 4 is estimated to be configured of 104 elements as a logic circuit. Each of the shift operation section 5 and the shift operation section 6 is estimated to be configured of 56 elements as a logic circuit. The selector 7 is estimated to be configured of 320 elements as a logic circuit. Therefore, the circuit scale of the third embodiment is 736 elements in total.

Next, the circuit scale of the fourth embodiment of the present invention will be described. In the fourth embodiment, the shift operation section 6 is omitted from the third embodiment. Therefore, the circuit scale of the fourth embodiment is 680 elements in total.

Next, the circuit scale of the fifth embodiment of the present invention will be described. In the fifth embodiment, a portion of 1 bit of the register 1, a portion of 1 bit of the register 3 and the shift operation section 8 are added to the third embodiment. Therefore, the circuit scale of the fifth embodiment is 808 elements in total.

Next, the circuit scale of the sixth embodiment of the present invention will be described. In the sixth embodiment, the configuration of the third embodiment is changed. The error determining section 4 is changed to the error determination condition operation section 9. The error determination condition operation section 9 is estimated to be configured of 64 elements as the logic circuit. Also, the selector 7 is estimated to be configured of 360 elements as the logic circuit, by the above-mentioned change. Therefore, the circuit scale of the sixth embodiment is 736 elements in total.

Next, the circuit scale of the seventh embodiment of the present invention will be described. In the seventh embodiment, the configuration of the fourth embodiment is changed. The error determining section 4 is changed to the error determination condition operation section 9. The error determination condition operation section 9 is estimated to be configured of 64 elements as the logic circuit. Also, the selector 7 is estimated to be configured of 360 elements as the logic circuit, due to the above-mentioned change. Therefore, the circuit scale of the seventh embodiment is 680 elements in total.

Lastly, the circuit scale of the eighth embodiment of the present invention will be described. In the eighth embodiment, the configuration of the fifth embodiment is changed. The error determining section 4 is changed to the error determination condition operation section 9. The error determination condition operation section 9 is estimated to be configured of 64 elements as a logic circuit. Also, the selector 7 is estimated to be configured of 360 elements as a logic circuit, due to the above-mentioned change. Therefore, the circuit scale of the eighth embodiment is 808 elements in total.

As above mentioned, the circuit scales of the divider circuits according to the embodiments of the present invention are reduced in any of the above-mentioned embodiments, compared with the conventional recovery-type divider circuit. Thus, there is an effect of reduction of the consumed power, compared with the conventional general divider circuit. Also, because the number of stages from the register 1, in which the dividend data is stored, to the register 3 is reduced through reduction of the circuit scale, the processing speed is improved, compared with the general divider circuit.

Next, the dividend data the increase rate of the circuit scale of the divider circuit will be described when the bit width of the register 1 is increased. The increase rate of the circuit scale of the divider circuit in the embodiments of the present invention is the first power of the increase rate of the bit width as the bit width of the register 1 increases. That is, supposing that the circuit scale of the divider circuit in the embodiments of the present invention is S3 when the bit width of the register 1 is n bits, the circuit scale 94 of the divider circuit in this embodiment when the bit width of the register 1 is increased from the n bits to m bits can be shown by the following equation (26).

$$S4 = S3 \times (m/n) \qquad (26)$$

This indicates remarkable improvement, compared with the second power in the conventional recovery-type divider circuit shown in the equation (2).

Above, the embodiments of the present invention have been described by referring to the attached drawings. Here, the present invention is not limited to the above-mentioned embodiments, and can be appropriately changed by a person in the art.

APPLICABILITY ON THE INDUSTRY

In the divider circuit of the present invention, the divisor is fixed to the maximum expressible by bits of a half of the bit width of the register. The applicability on the industry of the divider circuit of the present invention will be described.

Figure 20:
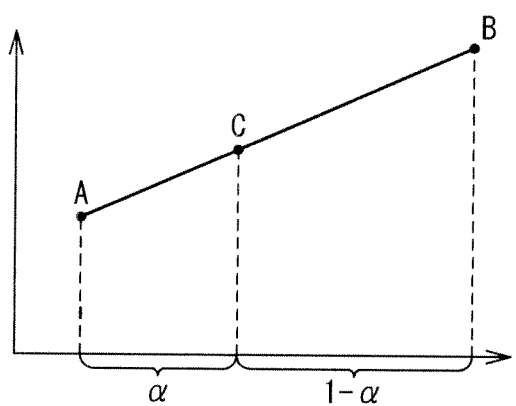
FIG. 20 is a diagram showing interpolation processing.

In the field of image processing, linear interpolation processing is used. FIG. 20 is a diagram used to show the linear interpolation processing. An equation for linear interpolation processing is shown hereinafter.

$$C = (1-\bullet) \times A + \bullet \times B \qquad (27)$$

The equation (27) is used in image synthesis processing such as expansion or contraction processing of an image and determination of a transmission rate. Especially, in the image synthesis processing, alpha blend processing is known. Because a range of • in the equation (27) is from "0" to "1", the processing imposes a load when the calculation of the equation (27) is realized in hardware. Therefore, a method of taking the value of • as an integer by dividing a line between two points A and B is considered. For example, when the line between two points A and B is divided by "255", the range of

• is from "0" to "255". At this time, an equation corresponding to the equation (27) is as follows:

$$C=((255-\bullet)\times A+\bullet\times B)/255 \quad (28)$$

In this way, in order to determine C in the equation (28), the right side needs to be divided by (the second power−1) ("255" in this case).

FIG. 21 is a block diagram showing an alpha blend processing circuit 20 using the equation (28). The alpha blend processing circuit 20 is provided with input registers 21 and 22, an output register 23, multipliers 24 and 25, am adder 26 and a divider circuit 27. A value A is set to the input register 21 and is multiplied by (255−•) by the multiplier 24. A value B is set to the input register 22 and is multiplied by • by the multiplier 25. An operation result C of the equation (28) is set to the output register 23.

Figure 1:
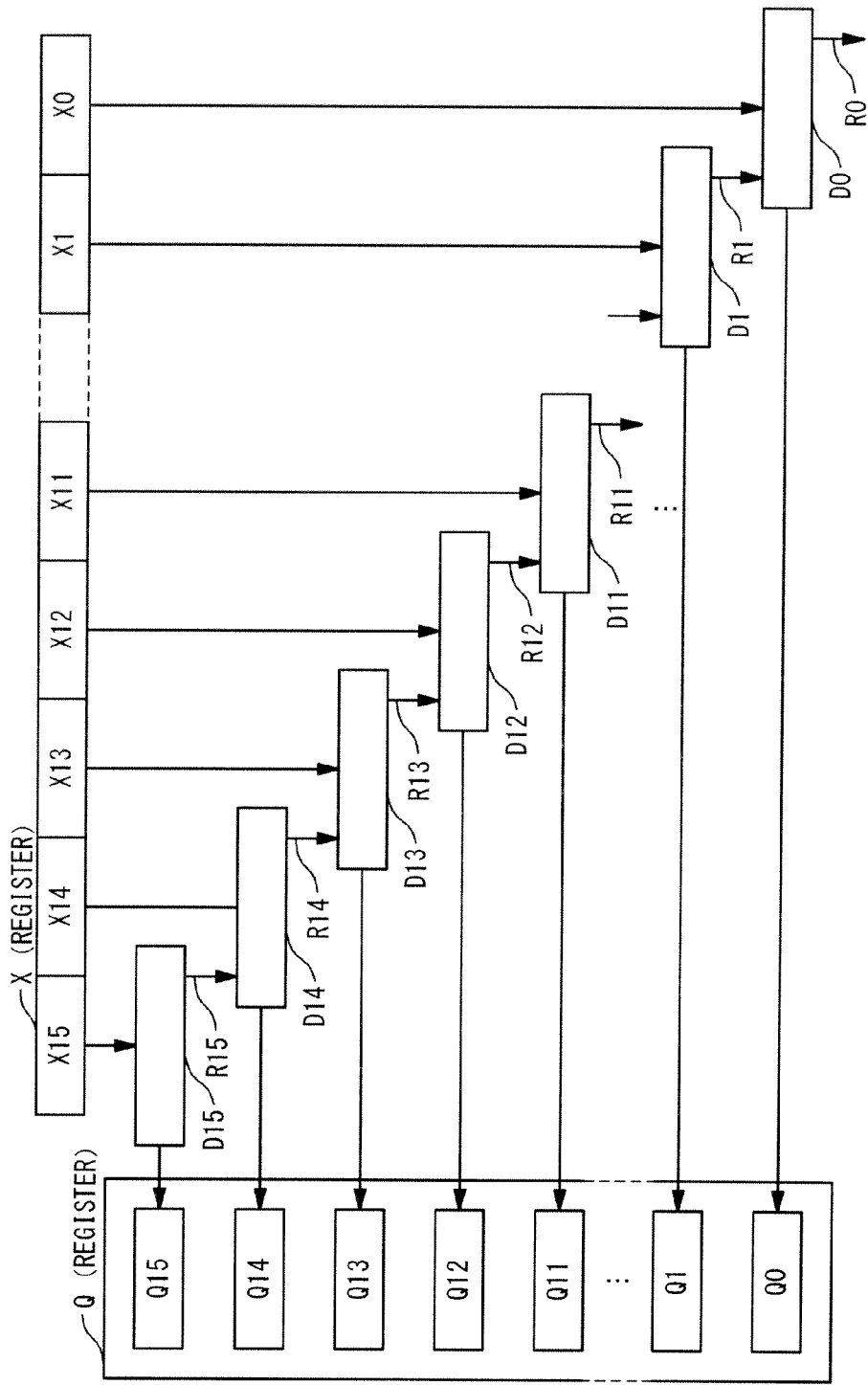
FIG. 1 is a block diagram showing the configuration of a conventional recovery-type divider circuit.
Figure 2:
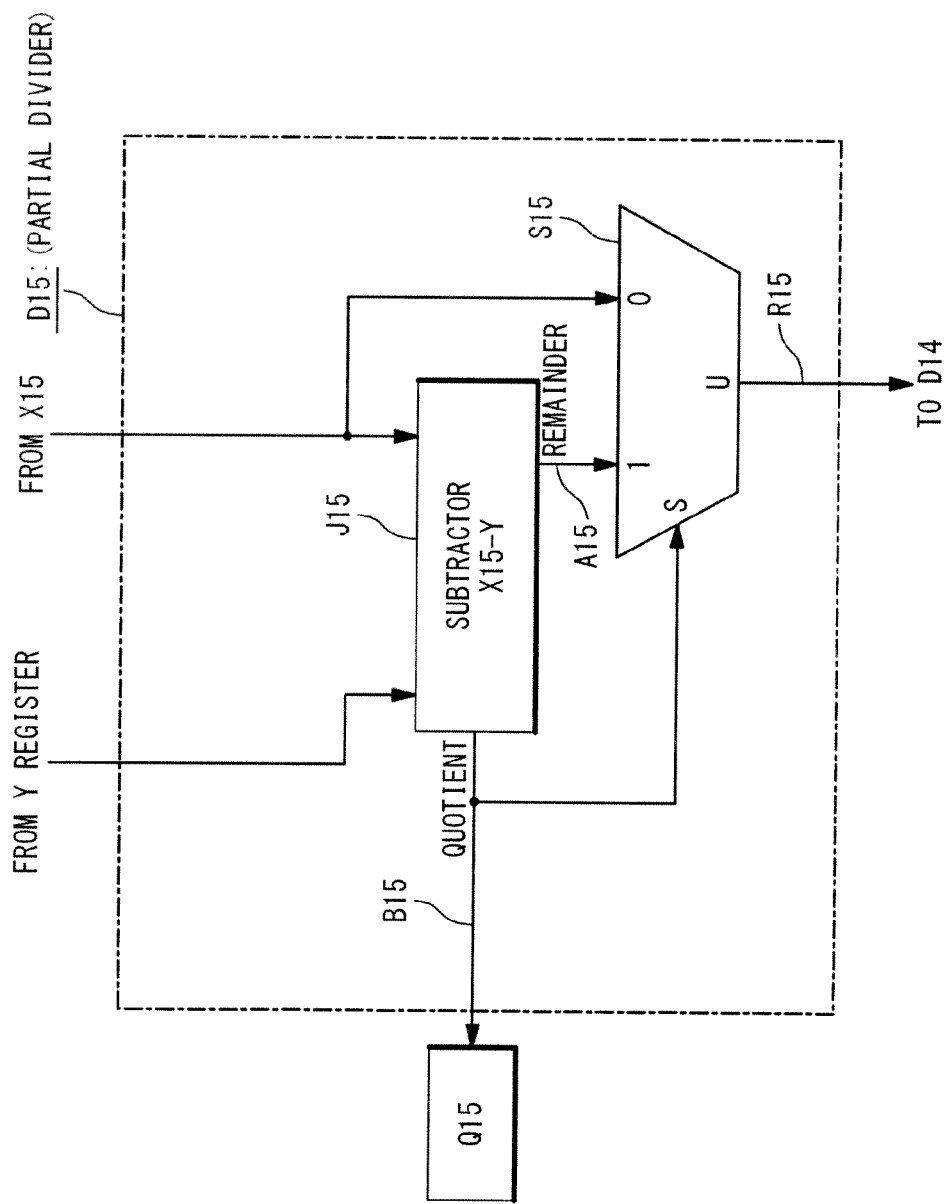
FIG. 2 is a block diagram showing the configuration of a partial divider D15 in FIG. 1.
Figure 3:
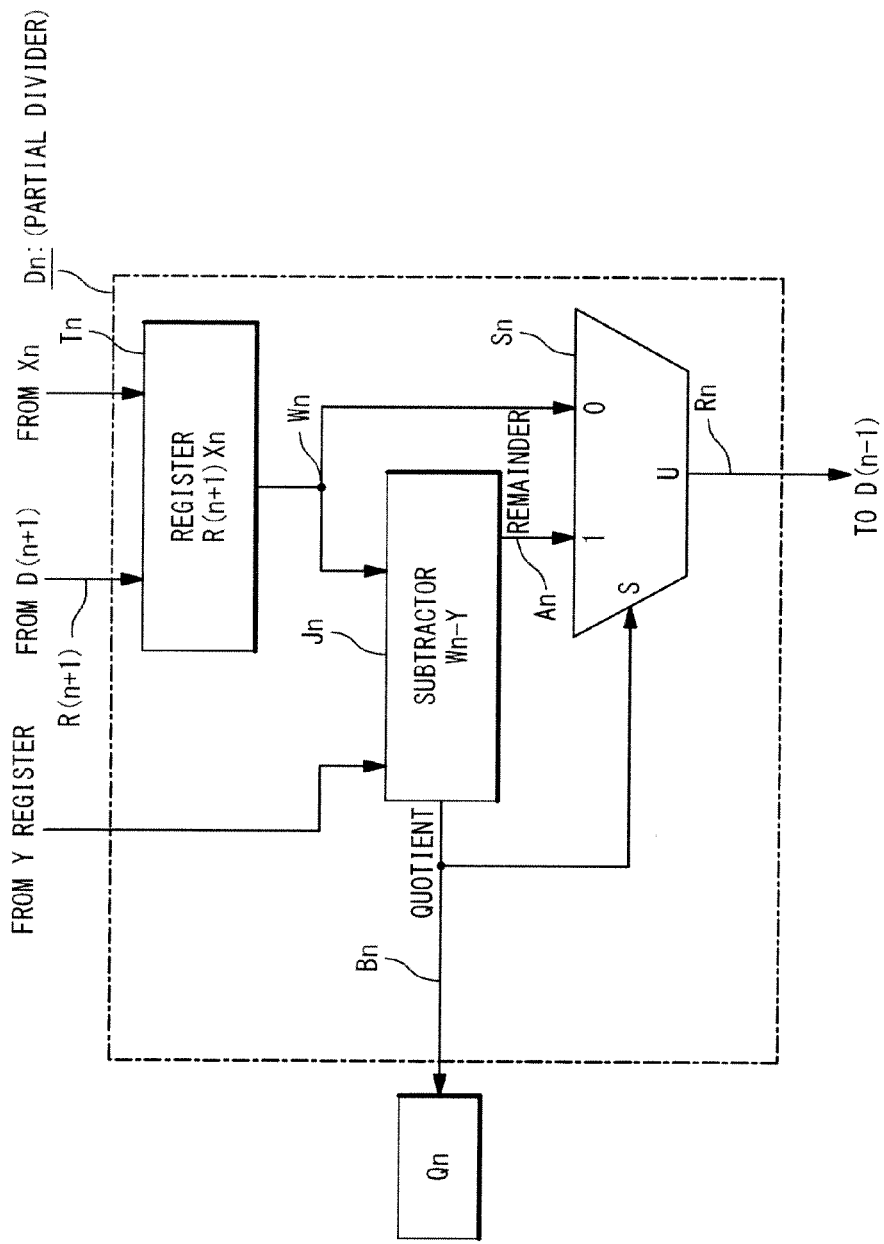
FIG. 3 is a block diagram showing the configuration of each of partial dividers D14 to D0 in FIG. 1.
Figure 4:
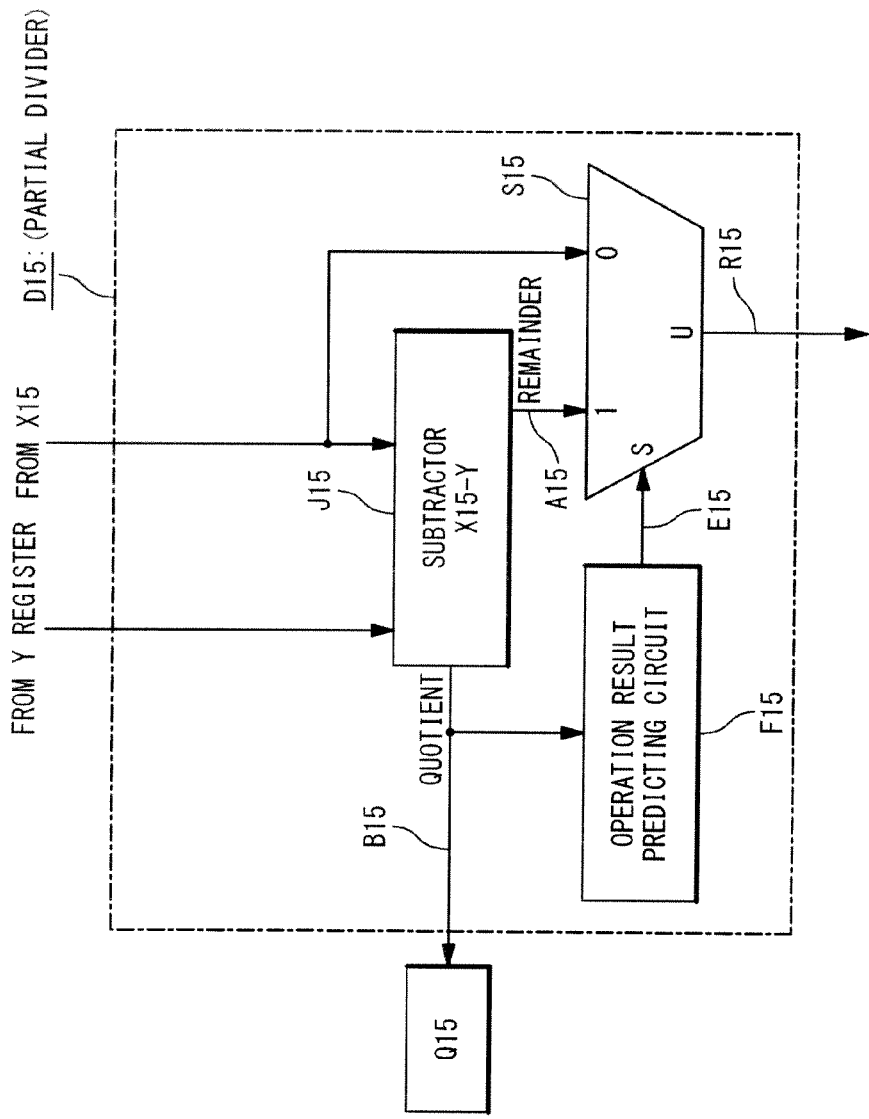
FIG. 4 is a block diagram showing the configuration of a partial divider D15 in Patent Literature 1.
Figure 5:
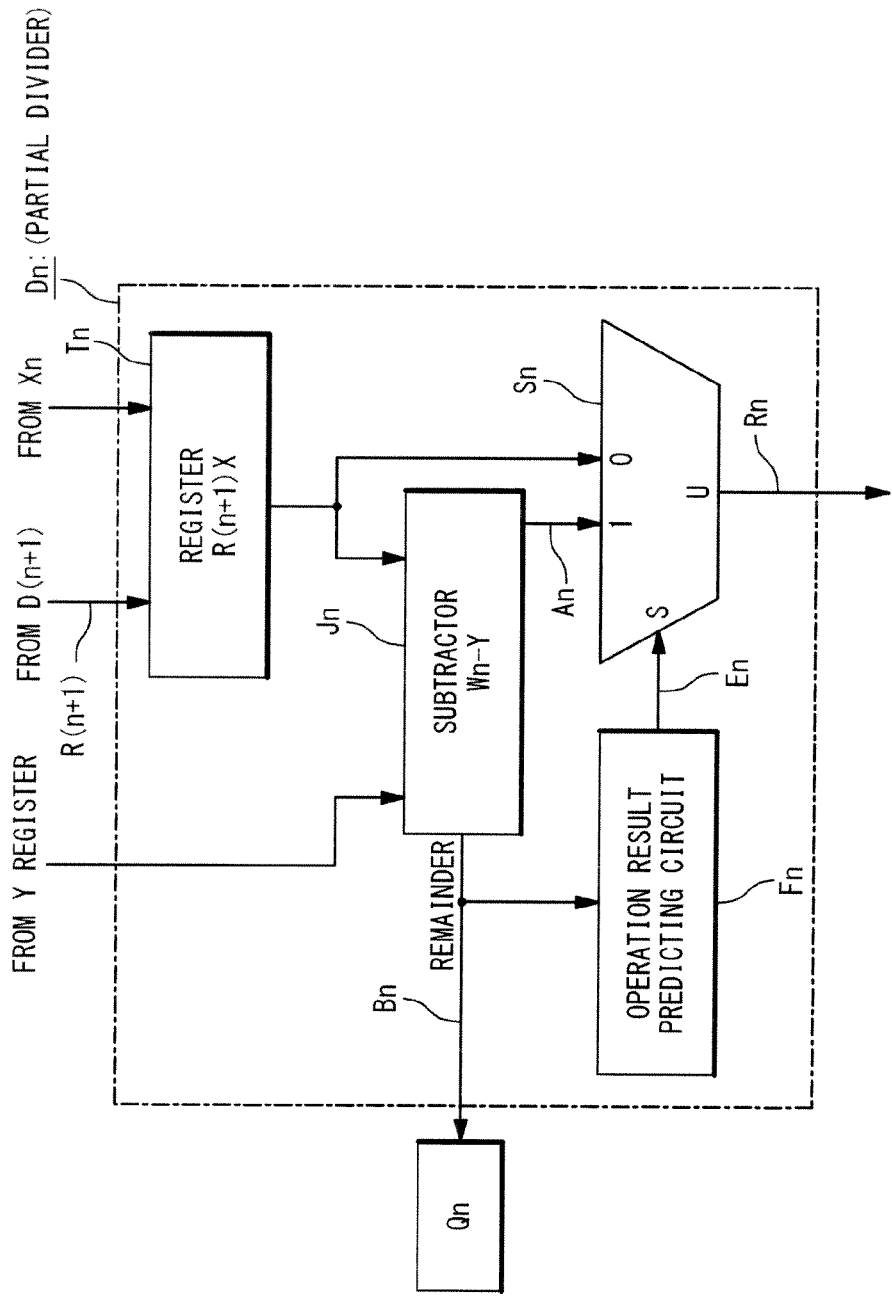
FIG. 5 is a block diagram showing the configuration of each of partial dividers D14 to D0 in Patent Literature 1.

The processing speed of the alpha blend processing circuit when the conventional divider circuit of FIG. 1 is applied to a divider circuit 27 and the processing speed of the alpha blend processing circuit when the divider circuit according to any of the embodiments of the present invention is applied to the divider circuit 27 are compared.

When the conventional divider circuit of FIG. 1 is applied to the divider circuit 27, the processing speed of the divider circuit 27 is 18 cycles. This 18 cycles are composed of 1 cycle for the processing to store a dividend in the register X and 16 cycles for the processing to sequentially operate the partial dividers D15 to D0, and 1 cycle for the processing to store a quotient in the register Q. Therefore, the processing speed of the alpha blend processing circuit 20 is 20 cycles as a total of 1 cycle for the processing of multipliers 24 and 25, 1 cycle for the processing of the adder 26, and 18 cycles for the processing of the divider circuit 27. Supposing that the processing time for 1 cycle is 2 (ns), the processing time of alpha blend processing circuit 20 is 40 (ns).

On the other hand, when the divider circuit according to the first embodiment of the present invention is applied to the divider circuit 27, the processing speed of the divider circuit 27 is 3 cycles. The 3 cycles are composed of 1 cycle for the processing to store the dividend in the register 1, 1 cycle for the processing of the shift operation section 2, and 1 cycle for the processing to store a quotient in the register 3. Therefore, the processing speed of the alpha blend processing circuit 20 is composed of 5 cycles as a total of 1 cycle for the processing of the multipliers 24 and 25, 1 cycle for the processing of the adder 26, and 3 cycles for the processing of the divider circuit 27. Supposing that the processing time for 1 cycle is 2 (ns), the processing time of the alpha blend processing circuit 20 is 10 (ns).

The processing speed of the alpha blend processing circuit when the divider circuit according to the first embodiment of the present invention is applied to the divider circuit 27 becomes fast 4 times, compared with the case where the conventional divider circuit of the FIG. 1 is applied to the divider circuit 27.

In the same way, the processing speed of the alpha blend processing circuit when the divider circuit according to any of the second embodiment to the eighth embodiment of the present invention is applied to the divider circuit 27 becomes fast compared with the processing speed when the conventional divider circuit of the FIG. 1 is applied to the divider circuit 27.

Next, the speed effect of an image processing unit 30 of a sprite method using alpha blend processing will be described. FIG. 22 is a block diagram of the image processing equipment 30 of the sprite method by using the alpha blend processing. The image processing unit 30 is provided with a pattern memory I/F section 31, a sprite processing section 32, a sprite pattern generating section 33, a line buffer 34, a frame control section 35 and an output processing section 36. The divider circuit according to the embodiments of the present invention is used in the sprite processing section 32. The details of the operation of each block are the same as a typical image processing equipment 30 using a sprite method, and therefore, the description is omitted.

The processing speed of the image processing equipment 30 when the conventional divider circuit of FIG. 1 is applied to the sprite processing section 32 is compared with the processing speed of the image processing equipment 30 when the divider circuit according to any of the embodiments of the present invention is applied to the sprite processing section 32.

The processing speed of the image processing equipment 30 when the conventional divider circuit of FIG. 1 is applied to the sprite processing section 32 is 22 cycles. The 22 cycles are composed of 1 cycle for the pattern memory I/F section 31, 18 cycles for the sprite processing section 32, 1 cycle for the linear buffer 34, 1 cycle for the frame control section 35 and 1 cycle for the output processing section 36.

Here, supposing that the clock frequency is in a range of 6 MHz to 40 MHz according to a display screen, the period is from the minimum of 25 (ns) to the maximum of 166 (ns). The processing time of the image processing unit 30 is from the minimum of 550 (ns) to the maximum of 3,652 (ns).

The processing speed of the image processing unit 30 when the divider circuit according to the first embodiment of the present invention is applied to the sprite processing section 32 becomes 7 cycles. The 7 cycles are composed of 1 cycle for the pattern memory I/F section 31, 3 cycles for the sprite processing section 32, 1 cycle for the linear buffer 34, 1 cycle for the frame control section 35 and 1 cycle for the output processing section 36.

When the clock frequency is set from 6 MHz to 40 MHz according to a display screen, the period is from 25 (ns) to 166 (ns). The processing time of the image processing unit 30 is from 175 (ns) to 1,162 (ns).

The processing speed of the image processing unit 30 when the divider circuit according to the first embodiment of the present invention is applied to the sprite processing section 32 is about 3 times, compared with a case where the conventional divider circuit of FIG. 1 is applied to the divider circuit 27.

The divider circuit and the dividing method according to the present invention have applicability on the industry in the above-mentioned field. Also, the applied field of the present invention is not limited to the above-mentioned field, and the above-mentioned field is one example of the application fields of the present invention.

What is claimed is:

1. A divider circuit comprising:
a register comprising an even number of bits and in which a dividend data is stored;
a shift operation section configured to acquire a data stored in an upper bit portion of said register when the even number of bits of said register is equally divided to said upper bit portion and a lower bit portion; and
an error determining section configured to calculate a summation of said upper bit portion data and a data of said lower bit portion and determine said error data based on said summation;
wherein said divider circuit provides a sum of the data stored in said upper bit portion and an error data as a quotient data when said dividend data is divided by a maximum of a divisor data which can be expressed by a half of the even number of bits of said register.

2. The divider circuit according to claim 1, further comprising:
- a second shift operation section configured to calculate an addition of "+1" and a data of said upper bit portion data as said quotient data;
- a selector configured to select said quotient data from said shift operation section when said error data is "0", and said quotient data from said second shift operation section when said error data is "1",
- wherein said error determining section determines that said error data is "0" when said summation is equal to or greater than "0" and less than said divisor data, and that said error data is "1" when said summation is equal to or greater than said divisor data and less than twice of said divisor data.

3. The divider circuit according to claim 2, further comprising:
- a third shift operation section configured to calculate an addition of +2 and said upper bits as said quotient,
- wherein said error determining section determines that said error data is "2" when said summation is twice of said divisor data, and
- wherein said selector selects said quotient data from said third shift operation section when said error data is "2".

4. The divider circuit according to claim 1,
- wherein said error determining section determines that said error data is "0" when said summation is equal to or greater than "0" and less than said divisor data, that said error data is "1" when said summation is equal to or greater than said divisor data and less than twice of said divisor data, and said error data is "2" when said summation is equal to twice of said divisor data, and
- wherein said shift operation section adds said error data determined by said error determining section to said upper bit portion of said register.

5. The divider circuit according to claim 1, further comprising:
- a second shift operation section configured to calculate an addition of "+1" and a data of said upper bit portion as said quotient data;
- a selector configured to select said quotient data from said shift operation section if said summation is equal to or greater than "0" and less than said divisor data, and select said quotient data from said second shift operation section if said summation is equal to or greater than said divisor data and less than twice of said divisor data.

6. The divider circuit according to claim 5, further comprising:
- a third shift operation section configured to calculate an addition of "+2" and said upper bit portion data as said quotient data,
- wherein said selector selects said quotient from said third shift operation section if said summation is equal to twice of said divisor data.

7. A divider circuit comprising:
- a register in which a dividend data is stored and which has a sign bit as a MSB (Most Significant Bit) and has a bit width of an even number of bits, except for said MSB;
- a shift operation section configured to acquire a dividend upper bit data stored in said MSB and an upper bit portion of said register when the even number of bits of said register is equally divided to said upper bit portion and a lower bit portion, as a quotient data when said dividend data is divided by a maximum of a divisor data which can be expressed by a half of the even number of bits of said register except for said MSB;
- a second shift operation section configured to calculate an addition of "+1" and said dividend upper bit data as said quotient data;
- a third shift operation section configured to calculate an addition of "+2" and said dividend upper bit data as said quotient data;
- a fourth shift operation section configured to calculate an addition of "−1" and to said dividend upper bit data as said quotient data;
- an error determining section configured to calculate an error determination condition value from (a data of said upper bit portion+a data of said lower bit portion)−(a data of said MSB)×2, and determine an error data based on said error determination condition value, wherein said error determining section determines said error data to be "−1" if said error determination condition value is negative, determines said error data to be "0" if said error determination condition value is equal to or greater than "0" and less than said divisor data, determines said error data to be "1" if said error determination condition value is equal to or greater than said divisor data and less than twice of said divisor data, and determines said error data to be "2" if said error determination condition value is equal to twice of said divisor data; and
- a selector configured to select said quotient data calculated by said shift operation section when said error data is "0", select said quotient data calculated by said second shift operation section when said error data is "1", select said quotient data calculated by said third shift operation section when said error data is "2", and selects said quotient data calculated by said fourth shift operation section when said error data is "−1".

8. A divider circuit comprising:
- a register in which a dividend data is stored and which has a sign bit as a MSB (Most Significant Bit) and has a bit width of an even number of bits except for said MSB;
- a shift operation section configured to acquire a dividend upper bit data stored in said MSB and an upper bit portion of said register when the even number of bits of said register is equally divided to said upper bit portion and a lower bit portion, as a quotient data when said dividend data is divided by a maximum of a divisor data which can be expressed by a half of the even number of bits of said register except for said MSB;
- a second shift operation section configured to calculate an addition of "+1" and said dividend upper bit data as said quotient data;
- a third shift operation section configured to calculate an addition of "+2" said dividend upper bit data as said quotient data;
- a fourth shift operation section configured to calculate an addition of "−1" and said dividend upper bit data as said quotient data;
- an error determining section configured to calculate an error determination condition value from (a data of said upper bit portion+a data of said lower bit portion)−(a data of said MSB)×2, and determines an error data based on said error determination condition value, wherein said error determining section determines said error data to be "−1" if said error determination condition value is negative, determines said error data to be "0" if said error determination condition value is equal to or greater than "0" and less than said divisor data, determines said error data to be "1" if said error determination condition value is equal to or greater than said divisor data and less than twice of said divisor data, and determines said error data to be "2" if said error determination condition value is equal to twice of said divisor data; and a selector configured to select said quotient data determined by said fourth shift operation section when said error determination condition value is negative, select said quotient data calculated by said shift operation section when said error determination condition value is equal to or greater than "0" and less than said divisor data, select said quotient data calculated by said second shift operation section when said error determination condition value is equal to or greater than said divisor data and less than twice of said divisor data, and select said quotient data calculated by said third shift operation section when said error determination condition value is equal to twice of said divisor data.

9. A dividing method in a divider circuit, said method comprising:

storing dividend data in a register of the divider circuit having a bit width of an even number of bits;

acquiring a data of an upper bit portion of said register by a shift operation section of the divider circuit when the even number of bits of said register is equally divided to said upper bit portion and a lower bit portion, and providing a sum of said data of the upper bit portion and an error data as a quotient data when said dividend data is divided by the maximum of a divisor data which can be expressed by a half of the even number of bits of said register; and calculating, by an error determining section of the divider circuit, a summation of said data of the upper bit portion and a data of said lower bit portion and determining said error data based on said summation.

10. The dividing method according to claim 9, further comprising:

calculating said quotient data by adding "+1" to said upper bit portion data by a second shift operation section;

determining said error data to be "0" by said error determining section if said summation is equal to or greater than "0" and less than said divisor data;

determining said error data to be "1" by said error determining section if said summation is equal to or greater than said divisor data and less than twice of said divisor data;

selecting said quotient data calculated by said shift operation section when said error data is "0"; and selecting said quotient calculated by said second shift operation section when said error data is "1".

11. The dividing method according to claim 10, further comprising:

calculating said quotient data by adding "+2" to said upper bit portion data by a third shift operation section;

determining said error data to be "2" by said error determining section if said summation is equal to twice of said divisor data; and selecting said quotient data calculated by said third shift operation section when said error data is "2".

12. The dividing method according to claim 9, further comprising:

determining said error data to be "0" by said error determining section if said summation is equal to or greater than "0" and less than said divisor data;

determining said error data to be "1" by said error determining section if said summation is equal to or greater than said divisor data and less than twice of said divisor data;

determining said error data to be "2" by said error determining section if said summation is equal to twice of said divisor data; and adding said error data determined by said error determining section to said upper bit portion data of said register by said shift operation section.

13. The dividing method according to claim 9, further comprising:

calculating said quotient data by adding "+1" of said upper bit portion data by a second shift operation section; and selecting by a selector, said quotient data calculated by said shift operation section if said summation is equal to or greater than "0" and less than said divisor data, and said quotient data calculated by said second shift operation section if said summation is equal to or greater than said divisor data and less than twice of said divisor data.

14. The dividing method according to claim 13, further comprising:

calculating said quotient by adding "+2" of said upper bit portion data by a third shift operation section; and selecting by said selector, said quotient data calculated by said third shift operation section if said summation is equal to twice of said divisor data.

15. A dividing method in a divider circuit, said method comprising:

storing a dividend data in a register of the divider circuit, wherein said dividend data has a sign bit as a MSB (Most Significant Bit), and has a bit width of an even number of bits except for said MSB;

acquiring by a shift operation section of the divider circuit, a dividend upper bit portion data of said MSB and an upper bit portion of said register when the even number of bits of said register is equally divided to said upper bit portion and a lower bit portion, as a quotient data when said dividend data is divided by a maximum of a divisor data which can be expressed by a half of the even number of bits of said register except for said MSB;

calculating said quotient data by adding "+1" to said dividend upper bit portion data by a second shift operation section;

calculating said quotient data by adding "+2" to said dividend upper bit portion data by a third shift operation section;

calculating said quotient by adding "−1" to said dividend upper bit portion data by a fourth shift operation section;

calculating, by an error determining section of the divider circuit, an error determination condition value from (said dividend upper bit portion data+a data of said lower bit portion)−(a data of said MSB)×2;

determining an error data based on said error determination condition value by said error determining section, wherein said determining comprises determining said error data to be "−1" if said error determination condition value is negative, said error data to be "0" if said error determination condition value is equal to or greater than "0" and less than said divisor data, said error data to be "1" if said error determination condition value is equal to or greater than said divisor data and less than twice of said divisor data, and said error data to be "2" if said error determination condition value is equal to twice of said divisor data; and selecting, by a selector, said quotient data calculated by said shift operation section when said error data is "0", said quotient data calculated by said second shift operation section when said error data is "1", said quotient data calculated by said third shift operation section when said error data is "2", and said quotient data calculated by said fourth shift operation section when said error data is "−1".

16. A dividing method in a divider circuit, said method comprising:
- storing a dividend data in a register of the divider circuit, wherein said dividend data has a sign bit as a MSB (Most Significant Bit) and has a bit width of an even number of bits except for said MSB;
- acquiring, by a shift operation section of the divider circuit, a dividend upper bit portion data of said MSB and an upper bit portion of said register when the even number of bits of said register is equally divided to said upper bit portion and a lower bit portion, as a quotient data when said dividend data is divided by a maximum of a divisor data which can be expressed by a half of the even number bits of said register excluding said MSB;
- calculating said quotient data by adding "+1" to said dividend upper bit portion data by a second shift operation section;
- calculating said quotient data by adding "+2" to said dividend upper bit portion data by a third shift operation section;
- calculating said quotient data by adding "−1" to said dividend upper bit portion data by a fourth shift operation section;
- calculating (a data of said upper bit portion+a data of said lower bit portion)−(said MSB data)×2 as an error determination condition value by an error determination condition operation section of the divider circuit;
- selecting, by said selector, said quotient data calculated by said fourth shift operation section if said error determination condition value is negative, said quotient data calculated by said shift operation section data if said error determination condition value is equal to or greater than "0" and less than said divisor, and said quotient data calculated by said second shift operation section if said error determination condition value is equal to or greater than said divisor data and less than twice of said divisor data, and said quotient data calculated by said third shift operation section if said error determination condition value is equal to twice of said divisor data.

\* \* \* \* \*